(12) United States Patent
Bhandari et al.

(10) Patent No.: US 7,593,396 B2
(45) Date of Patent: Sep. 22, 2009

(54) SYSTEM AND METHOD FOR PROVIDING REMOTE ACCESS TO TELECOMMUNICATIONS SERVICES

(75) Inventors: Anil Kumar Bhandari, Austin, TX (US); Xiaolian Bi, Austin, TX (US); Jeffrey Lewis Brandt, Cedar Park, TX (US); Christine Mary Hartman, Spicewood, TX (US); Alexander Lisheng Huang, Austin, TX (US); Jeffrey Paul Johnson, Austin, TX (US); James Thomas Miller, Austin, TX (US); Stephen Mark Mueller, Austin, TX (US); Jeffrey L. Scruggs, Austin, TX (US)

(73) Assignee: AT&T Labs, Inc., Austin, TX (US)

(*) Notice: Subject to any disclaimer, the term of this patent is extended or adjusted under 35 U.S.C. 154(b) by 707 days.

(21) Appl. No.: 11/064,092

(22) Filed: Feb. 24, 2005

(65) Prior Publication Data

US 2005/0141500 A1  Jun. 30, 2005

Related U.S. Application Data

(63) Continuation of application No. 09/619,312, filed on Jul. 19, 2000, now Pat. No. 6,891,940.

(51) Int. Cl.
*H04L 12/56* (2006.01)
(52) U.S. Cl. .................... 370/389; 370/392; 379/142.06
(58) Field of Classification Search ................. 370/259, 370/351, 352, 353, 354, 389, 392, 465, 466; 379/88.18, 88.25, 142.01, 142.04, 142.06, 379/142.13, 142.14, 219, 220.01, 221.08, 379/221.09, 221.1, 221.11, 219.01, 242.01
See application file for complete search history.

(56) References Cited

U.S. PATENT DOCUMENTS 4,232,199 A  11/1980 Boatwright et al.

(Continued)

FOREIGN PATENT DOCUMENTS

EP       0611083           8/1994

(Continued)

OTHER PUBLICATIONS

Internet Web Pages by Z-Tel, Personal Communications Center, dated Apr. 13, 2000 and May 15, 2000.

(Continued)

*Primary Examiner*—Chi H. Pham
*Assistant Examiner*—Kevin Mew
(74) *Attorney, Agent, or Firm*—Greenblum & Bernstein P.L.C.

(57) ABSTRACT

A system and method are provided for reviewing and updating a subscriber's telecommunications services using a graphical user interface via multiple data networks. A data message is received at an intelligent peripheral from the graphical user interface via at least one of the data networks. The data message indicates a subscriber's desired update to a selected service. The data message is converted into a protocol compatible with a service control point. The converted data message is identical to a data message that the intelligent peripheral would create if the subscriber had entered the desired update via an interactive voice response system. The converted data message is transmitted to the service control point, which updates the service in accordance with the subscriber's update. Thus, the service is updated substantially contemporaneously with the request. Moreover, the subscriber retains the ability to update and review service data via the interactive voice response.

16 Claims, 13 Drawing Sheets

U.S. PATENT DOCUMENTS

| | | | |
|---|---|---|---|
| 4,296,463 A | 10/1981 | Dalboussiere et al. | |
| 4,429,188 A | 1/1984 | Allen | |
| 4,611,094 A | 9/1986 | Asmuth et al. | |
| 4,611,096 A | 9/1986 | Asmuth et al. | |
| 4,788,718 A | 11/1988 | McNabb | |
| 4,860,347 A | 8/1989 | Costello | |
| 4,899,373 A | 2/1990 | Lee et al. | |
| 4,995,074 A | 2/1991 | Goldman et al. | |
| 5,054,055 A | 10/1991 | Hanle et al. | |
| 5,109,408 A | 4/1992 | Greenspan et al. | |
| 5,117,452 A | 5/1992 | Callele et al. | |
| 5,200,995 A | 4/1993 | Gaukel et al. | |
| 5,241,588 A | 8/1993 | Babson, III et al. | |
| 5,247,571 A | 9/1993 | Kay et al. | |
| 5,294,229 A | 3/1994 | Hartzell et al. | |
| 5,333,185 A | 7/1994 | Burke et al. | |
| 5,337,351 A | 8/1994 | Manabe et al. | |
| 5,343,516 A | 8/1994 | Callele et al. | |
| 5,345,380 A | 9/1994 | Babson, III et al. | |
| 5,353,331 A | 10/1994 | Emery et al. | |
| 5,398,220 A | 3/1995 | Barker | |
| 5,404,396 A | 4/1995 | Brennan | |
| 5,436,957 A | 7/1995 | McConnell | |
| 5,438,568 A | 8/1995 | Weisser, Jr. | |
| 5,444,768 A | 8/1995 | Lemaire et al. | |
| 5,448,631 A | 9/1995 | Cain | |
| 5,467,388 A | 11/1995 | Redd et al. | |
| 5,479,487 A | 12/1995 | Hammond | |
| 5,491,744 A | 2/1996 | Kikinis | |
| 5,513,251 A | 4/1996 | Rochkind et al. | |
| 5,519,767 A | 5/1996 | O'Horo et al. | |
| 5,533,102 A | 7/1996 | Robinson et al. | |
| 5,546,447 A | 8/1996 | Skarbo et al. | |
| 5,548,566 A | 8/1996 | Barker | |
| 5,550,909 A | 8/1996 | Chanda et al. | |
| 5,572,583 A * | 11/1996 | Wheeler et al. | 379/221.09 |
| 5,579,384 A | 11/1996 | Seymor | |
| 5,583,564 A | 12/1996 | Rao et al. | |
| 5,592,541 A | 1/1997 | Fleischer, III et al. | |
| 5,615,252 A | 3/1997 | Sizer, II et al. | |
| 5,625,676 A | 4/1997 | Greco et al. | |
| 5,629,978 A | 5/1997 | Blumhardt et al. | |
| 5,642,410 A | 6/1997 | Walah et al. | |
| 5,651,060 A | 7/1997 | Cohn et al. | |
| 5,655,013 A | 8/1997 | Gainsboro | |
| 5,657,451 A | 8/1997 | Khello | |
| 5,680,446 A | 10/1997 | Fleischer, III et al. | |
| 5,684,862 A | 11/1997 | Finnigan | |
| 5,687,212 A | 11/1997 | Kinser, Jr. et al. | |
| 5,696,815 A | 12/1997 | Smyk | |
| 5,712,903 A * | 1/1998 | Bartholomew et al. | 379/88.25 |
| 5,724,412 A | 3/1998 | Srinivasan | |
| 5,740,438 A | 4/1998 | Ratcliff et al. | |
| 5,742,668 A | 4/1998 | Pepe et al. | |
| 5,751,707 A | 5/1998 | Voit et al. | |
| 5,754,636 A | 5/1998 | Bayless et al. | |
| 5,758,351 A | 5/1998 | Gibson et al. | |
| 5,764,748 A | 6/1998 | Rosenthal et al. | |
| 5,787,237 A | 7/1998 | Reilly | |
| 5,790,173 A | 8/1998 | Strauss et al. | |
| 5,796,806 A | 8/1998 | Brickbichler | |
| 5,796,950 A | 8/1998 | Sips et al. | |
| 5,799,073 A | 8/1998 | Fleischer, III et al. | |
| 5,802,157 A | 9/1998 | Clarke et al. | |
| 5,802,159 A | 9/1998 | Smolentzov et al. | |
| 5,805,587 A | 9/1998 | Norris et al. | |
| 5,809,128 A | 9/1998 | McMullin | |
| 5,822,419 A | 10/1998 | Enstone et al. | |
| 5,825,862 A | 10/1998 | Voit et al. | |
| 5,850,429 A * | 12/1998 | Joyce et al. | 379/88.1 |
| 5,864,613 A | 1/1999 | Flood | |
| 5,867,495 A | 2/1999 | Elliott et al. | |
| 5,867,562 A | 2/1999 | Scherer | |
| 5,870,549 A | 2/1999 | Bobo, II | |
| 5,881,131 A | 3/1999 | Farris et al. | |
| 5,881,144 A | 3/1999 | Havens | |
| 5,892,822 A | 4/1999 | Gottlieb et al. | |
| 5,915,008 A | 6/1999 | Dulman | |
| 5,917,817 A | 6/1999 | Dunn et al. | |
| 5,920,618 A | 7/1999 | Fleischer, III et al. | |
| 5,933,490 A | 8/1999 | White et al. | |
| 5,933,778 A | 8/1999 | Buhrmann et al. | |
| 5,937,050 A | 8/1999 | Yue et al. | |
| 5,940,488 A | 8/1999 | DeGrazia et al. | |
| 5,946,381 A | 8/1999 | Danne et al. | |
| 5,958,016 A * | 9/1999 | Chang et al. | 709/229 |
| 5,982,774 A | 11/1999 | Foladare et al. | |
| 5,982,870 A | 11/1999 | Pershan et al. | |
| 5,999,611 A | 12/1999 | Tatchell et al. | |
| 6,014,379 A | 1/2000 | White et al. | |
| 6,028,917 A | 2/2000 | Creamer et al. | |
| 6,031,836 A | 2/2000 | Haserodt | |
| 6,031,896 A | 2/2000 | Gardell et al. | |
| 6,032,184 A | 2/2000 | Cogger et al. | |
| 6,038,227 A | 3/2000 | Farris et al. | |
| 6,038,296 A | 3/2000 | Brunson et al. | |
| 6,041,325 A | 3/2000 | Shah et al. | |
| 6,058,175 A | 5/2000 | Schultz | |
| 6,058,178 A | 5/2000 | McKendry et al. | |
| 6,078,581 A | 6/2000 | Shtivelman et al. | |
| 6,078,583 A | 6/2000 | Takahara et al. | |
| 6,081,589 A | 6/2000 | Jiang et al. | |
| 6,091,808 A | 7/2000 | Wood et al. | |
| 6,097,802 A | 8/2000 | Fleischer, III et al. | |
| 6,101,246 A | 8/2000 | Heinmiller et al. | |
| 6,104,799 A | 8/2000 | Jain et al. | |
| 6,115,040 A | 9/2000 | Bladow et al. | |
| 6,118,780 A | 9/2000 | Dunn et al. | |
| 6,125,126 A | 9/2000 | Hallenstål | |
| 6,134,310 A | 10/2000 | Swan et al. | |
| 6,160,877 A | 12/2000 | Tatchell et al. | |
| 6,161,128 A * | 12/2000 | Smyk | 709/205 |
| 6,167,122 A | 12/2000 | Titmuss et al. | |
| 6,173,437 B1 | 1/2001 | Polcyn | |
| 6,192,118 B1 | 2/2001 | Bayless et al. | |
| 6,195,678 B1 | 2/2001 | Komuro | |
| 6,195,697 B1 | 2/2001 | Bowman-Amuah | |
| 6,233,330 B1 | 5/2001 | McClure et al. | |
| 6,240,441 B1 | 5/2001 | Beckett et al. | |
| 6,246,751 B1 | 6/2001 | Bergl et al. | |
| 6,246,756 B1 | 6/2001 | Borland et al. | |
| 6,246,758 B1 | 6/2001 | Low et al. | |
| 6,259,449 B1 | 7/2001 | Saxena et al. | |
| 6,263,064 B1 | 7/2001 | O'Neal et al. | |
| 6,274,756 B1 | 8/2001 | Caers et al. | |
| 6,282,275 B1 | 8/2001 | Gurbani | |
| 6,317,484 B1 | 11/2001 | MacAllister | |
| 6,320,948 B1 | 11/2001 | Heilmann et al. | |
| 6,330,598 B1 | 12/2001 | Beckwith et al. | |
| 6,337,899 B1 | 1/2002 | Alcendor et al. | |
| 6,411,697 B1 | 6/2002 | Creamer et al. | |
| 6,445,694 B1 | 9/2002 | Swartz | |
| 6,463,145 B1 | 10/2002 | O'Neal et al. | |
| 6,529,596 B1 | 3/2003 | Asprey et al. | |
| 6,574,661 B1 | 6/2003 | Delano et al. | |
| 6,631,186 B1 | 10/2003 | Adams et al. | |
| 6,647,111 B1 * | 11/2003 | Bjornberg et al. | 379/220.01 |
| 6,675,017 B1 * | 1/2004 | Zellner et al. | 455/456.1 |
| 6,778,651 B1 | 8/2004 | Jost et al. | |
| 6,885,737 B1 * | 4/2005 | Gao et al. | 379/93.17 |
| 6,963,633 B1 * | 11/2005 | Diede et al. | 379/88.03 |
| 7,242,754 B2 * | 7/2007 | Adams et al. | 379/201.02 |
| 2001/0012354 A1 * | 8/2001 | Silver | 379/221.08 |
| 2002/0031207 A1 | 3/2002 | Lin | |

| | | | |
|---|---|---|---|
| 2002/0054587 | A1 | 5/2002 | Baker et al. |
| 2002/0165969 | A1 | 11/2002 | Gallant |
| 2002/0168055 | A1 | 11/2002 | Crockett et al. |
| 2003/0076941 | A1 | 4/2003 | Tiliks et al. |
| 2003/0079028 | A1 | 4/2003 | Kortum et al. |
| 2003/0161459 | A1 | 8/2003 | McBlain et al. |
| 2003/0202640 | A1* | 10/2003 | Knott et al. ............ 379/88.01 |
| 2004/0005045 | A1 | 1/2004 | Adams et al. |
| 2004/0022379 | A1 | 2/2004 | Klos et al. |

FOREIGN PATENT DOCUMENTS

| | | |
|---|---|---|
| EP | 0740480 | 10/1996 |
| WO | 92/09164 | 5/1992 |
| WO | 98/52342 | 11/1998 |
| WO | 99/16230 | 4/1999 |
| WO | 99/20058 | 4/1999 |
| WO | 00/10346 | 2/2000 |
| WO | 00/65857 | 11/2000 |
| WO | 01/35240 | 5/2001 |

OTHER PUBLICATIONS

Internet Web Pages by TOSC International, Cool Call, dated May 4, 2000.

Internet Web Pages by Phone.Com, My Phone Service., dated May 4, 2000.

Internet web pages by Dazil Internet Services, "Caller EyeDee", downloaded Dec. 2001.

English Language Abstract of EP 0611083, (Aug. 1994).

English Language Abstract of EP 0740480, (Oct. 1996).

"MegaHub PACE SMS- Service Management System- Advanced Intelligent Network Systems," Communications Corporation, Issue 0.4, (Jul. 1994).

Berman, Roger K., and Brewster, John H., "Perspectives on the AIN Architecture," IEEE Communications Magazine, pp. 27-32 (Feb. 1992).

Advanced Intelligent Network (AIN) 0.1 Switching Systems Generic Requirements (Bellcore TR-NWT-001284), Issue 1 (Aug. 1992).

Advanced Intelligent Network (AIN) 0.1 Switch-Service Control Point (SCP) Application Protocol Interface Generic Requirements (Bellcore TR-NWT-001285), Issue 1, (Aug. 1992).

BT Technology Journal, vol. 13, No. 2., Ipswich GB. pp. 132-142, Marshall et al., "The information services supermarket" (Apr. 1995).

"Next Generation Phone System", retrieved from the internet at CommWeb.com (Aug. 2001).

Lennox et al., "Call processing Language Framework and Requirements", RFC 2824 (May 2000).

Lennox et al., "CPL: A Language for User Control of Internet Telephony Services", Internet Engineering Task Force, IPTEL WG (Oct. 2000).

J. Rosenberg, "Introduction to CPL", Dynamicsoft, Winter 2001 Von Developers Conference (Feb. 2001).

"Teleglobe International Toll Free Services", retrieved from the internet at teleglobe.com (Dec. 2002).

"Sprint Wholesale Toll-Free Services", retrieved from the internet at sprintbiz.com/wholesale/products/toll_free_services.pdf (Jan. 2001).

Internet web pages by TOSC International, "Cool Call", dated May 4, 2000.

Internet web pages by Phone. Com, "My Phone Service", dated May 4, 2000.

Internet web pages by Sea Communications, Inc., "Wav-Mail", dated Jul. 28, 2000.

Internet web pages by Donner, Chris, "Pondering PC-PBX Permutations", CTI PCPBX Round-up, dated Dec. 1998.

Internet web pages by CNN. com, "Internet Call Waiting Turns One Phone Line Into Two", dated Aug. 13, 1999.

Internet web pages by Cincinnati Bell, "Internet Call Manager", dated 2000.

* cited by examiner

SYSTEM AND METHOD FOR PROVIDING REMOTE ACCESS TO TELECOMMUNICATIONS SERVICES

This Application is a continuation application of U.S. patent application Ser. No. 09/619,312, filed on Jul. 19, 2000, and issued as U.S. Pat. No. 6,891,940, the disclosure of which is expressly incorporated herein by reference in its entirety.

BACKGROUND OF THE INVENTION

1. Field of the Invention

The present invention relates to the field of telecommunications. More particularly, the present invention relates to a Personal Call Manager, a.k.a. Personal Communications Manager (PCM) providing subscribers integrated access to communications services through a data network, such services include a Remote Access to Caller Identification (RACLID) system. The RACLID system enables subscribers to review caller identification information associated with incoming calls to the subscriber's telephone line from a remote location.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, the acronyms are defined as follows:

Advanced Intelligent Network (AIN)
Authentication/Subscription Information (ASI)
Caller Identification (Caller ID)
Customer Premises Equipment. (CPE)
Dual Tone Multi-Frequency (DTMF)
Graphical User Interface (GUI)
Generic Data Interface (GDI)
HyperText Mark-Up Language (HTML)
HyperText Transfer Language Protocol (HTTP)
Incoming Call Manager (ICM)
Integrated Service Control Point (ISCP)
Interactive Voice Response (IVR)
Java Database Conductivity (JDBC)
Lightweight Directory Access Protocol (LDAP)
Line Information Database (LIDB)
Outgoing Call Control (OCC)
Personal Computer (PC)
Personal Call Manager/Personal Communications Manager (PCM)
Personal Identification Number (PIN)
Public Switched Telephone Network (PSTN)
Remote Access to Caller Identification (RACLID)
Service Management System (SMS)
Service Node (SN)
Service Switching Point (SSP)
Signaling System 7 (SS7)
Signaling Transfer Point (STP)
Terminating Attempt Trigger (TAT)
Transaction Capabilities Application Part (TCAP)
Transmission Control Protocol/Internet Protocol (TCP/IP)
User Interface (UI)
World Wide Web (WWW)

3. Background Information

Currently, subscribers to call control services within the Public Switched Telephone Network (PSTN) are able to initiate and modify their services by calling a customer service representative or by interacting with an Interactive Voice Response (IVR) system using a standard Dual Tone Multi-Frequency (DTMF) telephone device. These methods practically limit the number and types of services that can be provided to and modified by the subscribers because all information pertaining to the services is presented audibly. In addition, the potential market for subscribers to call control services is not fully exploited because of customer reluctance to use IVR systems. An additional drawback is that, conventionally, each PSTN service has a corresponding IVR interface, so that as a customer subscribes to additional services, he or she must keep track of additional IVR telephone numbers and Personal Identification Numbers (PINs).

There have been attempts to remedy the problems associated with IVR access to PSTN services. These attempts incorporate use of packet switched data networks, such as the Internet, to avoid conventional WR systems and to streamline the initiation and modification functions. The current Internet based systems have several drawbacks, however, including the inability to ensure near real-time update of services and incompatibility with existing IVR implementations.

For many call control services, the subscribers must submit requests to the customer service arm of their provider to initiate new services or update existing ones. The requests are implemented according to the provider's time line and discretion. It is difficult for the users to gauge when the service alteration will take effect. Also, because the current Internet based systems operate exclusively from the conventional IVR systems, i.e., the two systems cannot coexist, customers must select either the Internet interface or the IVR interface. Consequently, a customer who has selected the Internet interface, and who is without a PC and/or Internet access, is not able to make desired changes to his or her services through an IVR. The inability to implement desired changes is especially troublesome considering that users are often interested in altering some call services (e.g., call forwarding, paging, and caller ID) when they are away from their home or business telephone and PC.

An example of call control services provided over a packet switched data network is described in CHANG et al., U.S. Pat. No. 5,958,016, which teaches enabling Advanced Intelligence Network (AIN) services over the World Wide Web (WWW) through a provisioning system called the Service Management System (SMS). The SMS as disclosed in CHANG et al., however, does not ensure near real-time data update and is not compatible with existing IVR implementations. Therefore, the services presented via the Web are limited in functionality to the extent near real-time data updates are not guaranteed. For example, if a subscriber modifies an incoming call service, which blocks calls from selected phone numbers or classes of phone numbers, to add an allowed incoming phone number, the subscriber will not begin immediately to receive calls from the previously blocked phone number. Rather, the subscriber must wait an unspecified period of time for the service to be updated via the SMS. Also, as discussed above, the Web interface and the IVR interface are mutually exclusive.

The present invention pertains to a Personal Call Manager, a.k.a. a Personal Communications Manager (PCM) system that resolves these problems simply and efficiently. The PCM provides an interface to telecommunication services, such as personal directories, Incoming Call Manager (ICM), Outgoing Call Control (OCC) and the like. In addition, the PCM interfaces to an improved caller identification (Caller ID) system, referred to as Remote Access to Caller Identification (RACLID).

Conventional Caller ID services provided through the PSTN necessitate the attachment of Customer Premises Equipment (CPE) to a telephone jack corresponding to the telephone number(s) subscribing to the Caller ID service. The user may review a log of Caller ID information associated with incoming calls by physically reviewing the information displayed on the CPE. Typically, the. Caller ID information includes the name and/or number of the calling party, as well as the date and time of the incoming telephone call.

A limitation of the conventional service is that, in order to review the Caller ID information, the subscriber must be present at the CPE. It would be advantageous, however, for subscribers to be able to review their Caller ID information remotely, e.g., at work, while commuting, on vacation, etc. Because callers do not always leave messages on an answering device or service, which may be remotely accessible, a subscriber cannot determine through the conventional Caller ID service who has attempted to call until the subscriber physically returns and views the CPE. Consequently, the conventional Caller ID system has several drawbacks, including delayed awareness of incoming telephone calls and subsequently delayed response to those calls.

Some attempts at solving these problems associated with CPE implemented Caller ID services have been presented. For example, VOIT et al., U.S. Pat. No. 5,751,707, discloses transmitting Caller ID information to a server using GDI. Also, DANNE et al., U.S. Pat. No. 5,946,381, discloses running a JAVA application on a terminal to receive Caller ID information over the World Wide Web (WWW).

However, these attempts have several inherent disadvantages. For instance, in both DANNE et al. and VOIT et al., processing of the telephone call is interrupted in order to perform the Caller ID function. Also, the methods provide Caller ID information only when the call is in progress, and in the case of DANNE et al., only when the user is online and running a JAVA application. That is, the user cannot obtain the Caller ID information at his or her convenience. Finally, a significant portion of the intelligence aspects of the DANNE et al. Caller ID system is required to be in the terminals, thus limiting the types of devices that can access the Caller ID information.

The present invention overcomes the problems associated with the prior art, as described below.

BRIEF DESCRIPTION OF THE DRAWINGS

The present invention is further described in the detailed description that follows, by reference to the noted plurality of drawings by way of non-limiting examples of preferred embodiments of the present invention, in which like reference numerals represent similar parts throughout several views of the drawings, and in which.

DETAILED DESCRIPTION OF EMBODIMENTS

Figure 1:
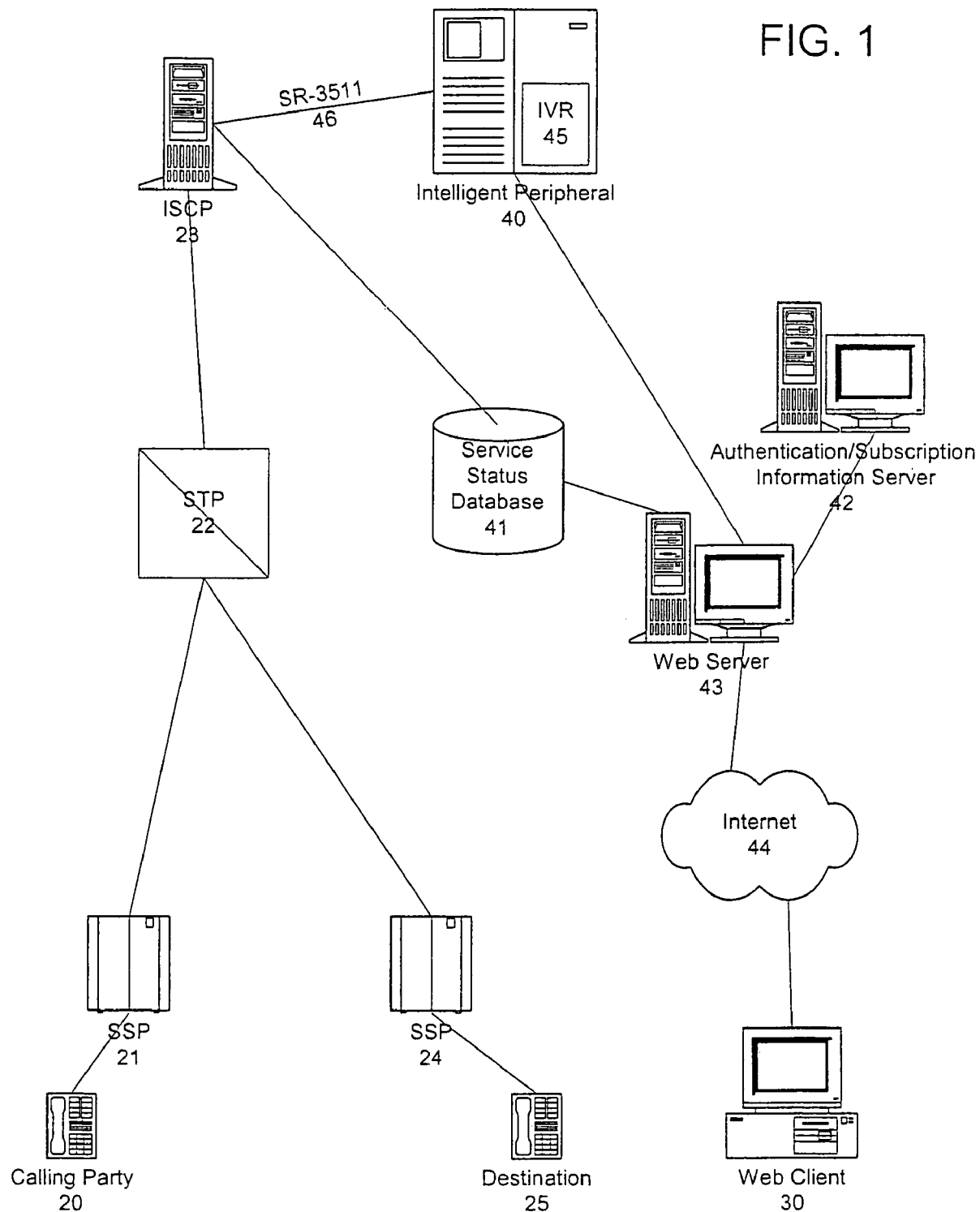
FIG. 1 is a block diagram illustrating system components, according to an aspect of the present invention.

In view of the above, the present invention through one or more of its various aspects and/or embodiments is presented to accomplish one or more objectives and advantages, such as those noted below.

An aspect of the present invention provides a user/subscriber access to a PCM system through a communications network, including the Internet and other data networks, without excluding the possibility of conventional IVR access. Thus, the subscriber can conveniently customize services managed by the PCM through a graphical user interface (GUI) that efficiently presents the complex data associated with the managed services with minimal service provider interaction. Another aspect of the invention provides for updating the actual service data in the PSTN substantially contemporaneously with access to the service data via the PCM, permitting near real-time access to the services managed by the PCM.

In another aspect of the present invention, the PCM manages multiple services, including, for example, Caller ID. Thus, the present invention provides the subscriber access to Caller ID information remotely over the communications network in an efficient and user-friendly manner.

According to another aspect of the present invention, a method is provided for reviewing service data relating to a subscriber's telecommunications services using a graphical user interface. The method includes transmitting a data message from the subscriber to an intelligent peripheral through at least one data network, the data message indicating a subscriber's desire to review the service data, and converting the data message into a protocol compatible with an integrated service control point. The converted data message is identical to a data message that the intelligent peripheral would create if the subscriber had indicated the desire to review the service data via an interactive voice response system. The protocol may be the SR-3511 protocol. Then, the converted data message is transmitted to and the service data is retrieved from the integrated service control point. The service data is forwarded to the subscriber through the intelligent peripheral. The subscriber retains the ability to review service data through an interactive voice response.

In another aspect of the present invention, a method is provided for reviewing and updating a subscriber's telecommunications services using a graphical user interface through multiple data networks, including presenting service data to the subscriber through the data networks and transmitting a data message from the subscriber to an intelligent peripheral through at least one of the data networks. The data message indicates the subscriber's desired update to a selected telecommunications service. The data message is converted into a protocol compatible with an integrated service control point, which protocol includes the SR-3511 protocol. The converted data message is identical to a data message that the intelligent peripheral would create if the subscriber had entered the desired update through an interactive voice response system. Then, the converted data message is transmitted to the integrated service control point and the selected telecommunications service is updated in accordance with the subscriber's desired update. The selected telecommunications service is updated substantially contemporaneously with the subscriber requesting the update at the graphical user interface. Also, the subscriber retains the ability to update and review service data through an interactive voice response. The presentation of service data may include retrieving the service data from a service status database, which is periodically updated by the integrated service control point. This reduces traffic through the integrated service control point.

In a further aspect of the present invention, a method is provided for accessing service data relating to a subscriber's telecommunications services using a graphical user interface (GUT) through multiple data networks, and using an interactive voice response (IVR) system through a public switched telecommunications network. The method includes providing the subscriber with the option of accessing the service data through more than one interface, including the IVR system and the GUI, and the subscriber selecting either the IVR system or the GUI. The service data is accessed through an intelligent peripheral, which obtains the service data from an integrated service control point. The service data is presented to the subscriber through the selected interface, so that the subscriber can access the service data through the IVR system or the GUI, based upon the subscriber's selection.

According to another aspect of the present invention, a system is provided for reviewing and updating a subscriber's telecommunications services using a graphical user interface through multiple data networks. The system includes a Web client, through which the subscriber views service data received through the data networks and requests service data updates. The service data is viewed through a graphical user interface. The system further includes a Web server that receives a data message, which indicates a subscriber's desired update to a selected telecommunications service, transmitted from the subscriber in response to a service data update and an intelligent peripheral, which receives the data message via at least one of the data networks. The intelligent peripheral translates the data message into a standard protocol, which includes the SR-3511 protocol. The translated data message is identical to a data message that the intelligent peripheral would create if the subscriber had entered the desired update through an interactive voice response system. The system also includes an integrated service control point that receives the message in the standard protocol and updates the selected telecommunications service in accordance with the subscriber's desired update. The selected telecommunications service is updated in the integrated service control point substantially contemporaneously with the subscriber requesting the update at the graphical user interface. Furthermore, the subscriber retains the ability to update and review the service data through an interactive voice response. The system may include a service status database from which the service data is initially retrieved, thereby reducing traffic on the integrated service control point.

In another aspect of the present invention, a method is provided for accessing caller ID data relating to a subscriber's remote access to caller ID service using a graphical user interface (GUI). The method includes identifying selected telecommunications services managed by a personal call manager account belonging to the subscriber, at least one which is the remote access to caller ID service. The telecommunications services are presented to the subscriber at the GUI through at least one data network. The subscriber then queries an intelligent peripheral through the data network indicating the subscriber's desire to access the remote access to caller ID service. The caller data is then retrieved from a call logger database, which stores the caller ID data, in response to the query. The caller ID data is transmitted to the subscriber through the data network and is displayed at the GUI.

In a still further aspect of the present invention, a method is provided for providing caller ID information associated with a telephone call from a calling party to a destination, the caller ID information being provided over multiple networks to a subscriber at a location remote from the destination. The method includes storing caller ID data in a call logger database in response to the calling party placing the telephone call to the destination. A caller ID query is received from the remotely located subscriber through at least one of the networks. In response to the caller ID query, the caller ID data is retrieved from the call logger database, transmitted to the remotely located subscriber through at least two of the networks and displayed at the remote subscriber's location.

The method for providing caller ID information to a subscriber at a location remote from the telephone call destination may further include initially launching an AIN trigger when the calling party places the telephone call to the destination which subscribes to a remote caller ID service. In that case, the storing of caller ID data includes transmitting calling party information associated with the calling party from an integrated service control point to a GDI server, obtaining additional information from a directory server based upon the calling party information and transmitting the caller ID information from the GDI server to the call logger database. The additional information can be obtained from the directory server by either the GDI server or by the integrated service control point, which forwards the additional information to the GDI server. The caller ID information may include the calling party information and the additional information.

The method for providing caller ID information to a subscriber at a location remote from the telephone call destination may also include determining whether the subscriber has activated the remote caller ID service. Also, at least one of the networks may be a packet switched data network, which may include the Internet. Also, receiving the caller ID query may include receiving at a Web server the caller ID query from the subscriber through a Web client, so that transmitting the caller ID data to the remotely connected subscriber includes transmitting the caller ID data from the Web server to the web client.

In another aspect of the present invention, a system is provided for providing caller ID information, associated with a telephone call from a calling party to a destination, to a subscriber at a location remote from the destination. The system includes an advanced intelligent network (AIN), which includes an integrated service control point that forwards calling party information in response to the telephone call, and a private network, which includes multiple servers in communication with one another. A first group of servers forwards caller ID information based upon the received calling party information, to a call logger database. The system further includes a public network, including a client which sends a caller ID query to a second group of servers. The public network retrieves the caller ID information from the call logger database and sends the caller ID information to the client. The subscriber can view the caller ID information while being located remotely from the destination of the telephone call associated with the caller ID information. The public network may be the Internet and the client may be a Web browser.

According to another aspect of the present invention, a system is provided for providing caller ID information, associated with a telephone call from a calling party to a destination, to a subscriber at a location remote from the destination. The system includes a switch, associated with the destination, that receives the telephone call from the calling party. The switch has an AIN trigger set to launch a query in response to the telephone call. The system further includes an integrated service control point that forwards calling party information in response to the query and an interface server that obtains additional information from a directory server, based upon the received calling party information. The caller ID information includes the additional information and the calling party information. The system further includes a call logger database that receives the caller ID information from the interface server and stores the caller ID information. The system also includes a Web client that forwards a caller ID query from the subscriber and a Web server that receives the caller ID query from the Web client over the Internet and, in response to the query, retrieves the caller ID data from the call logger database and forwards the caller ID data to the Web client for display to the subscriber. The subscriber can view the caller ID information while being located remotely from the destination of the telephone call associated with the caller ID information.

The present invention is an AIN based system and method that allows a PCM subscriber connected to a communications network, including the Internet and other packet switched type data networks, as well as through conventional IVR systems, to customize and execute services associated with telephonic communications, with near real-time access to the service data. FIG. 1 illustrates an exemplary telecommunications network (e.g., PSTN) in association with the present invention. The network includes a calling party 20, an originating Service Switching Point (SSP) 21, a terminating SSP 24 and a subscriber's telephone (i.e., the destination) 25. The network also includes a Signaling Transfer Point (STP) 22, an Integrated Service Control Point (ISCP) 23 and an Advanced Intelligent Network-Intelligent Peripheral (AIN-IP or intelligent peripheral) 40. The intelligent peripheral 40 includes an interactive voice response (IVR) system. By way of example, the ISCP 23 may be implemented with the Bellcore Integrated Service Control Point, loaded with ISCP software Version 4.4 (or higher), available from Telecordia, Murray Hill, N.J.

A data network includes a Web client 30, a Web server 43, an Authentication/Subscription Information Server 42 and a Service Status Database 41. The data network communicates to the PSTN (specifically the ISCP 23) through the intelligent peripheral 40 using the SR-3511 protocol 46, or an equivalent protocol.

The user is able to access the intelligent peripheral 40 through the Web server 43, which is in communication with the Internet 44 or other packet switched data network. The user is alternatively able to access the intelligent peripheral 40 through the IVR system 45 using a conventional DTMF telephone connection. When using the Internet, the user accesses the Web server 43 with a PC, acting as a Web client 30, using software such as ICW Client, available from Southwestern Bell Telephone Company. The Web client may likewise incorporate a Web browser, such as Microsoft Internet Explorer, available from Microsoft Corporation, or Netscape Navigator. In one embodiment, the Web client 30 is implemented with an IBM Pentium based computer, running the Linux or Microsoft Windows operating system and the Microsoft Internet Explorer, Netscape Navigator or Hotjava, available from Sun Microsystems, Inc., Web browser software. An embodiment of the invention with respect to the Web server 43 may include running the Linux or Microsoft Windows operating system and the Apache Web server software, available from the Apache Software Foundation, or the Jigsaw Web server software, available from World Wide Web Consortium (W3C).

The SSP 24 is the terminating central office (CO) for the PCM subscriber 25 and the SSP 21 is the originating CO for the calling party 20. However, the terminating CO and the originating CO may be the same. The SSPs 21 and 24 may comprise, for example, 1AESS or 5ESS switches manufactured by Lucent Technologies, Inc., or DMS-100 switches manufactured by Nortel Networks Corporation (Nortel), or AXE-10 switches manufactured by Telefonaktiebolaget LM Ericsson.

The 1AESS switches may use an AIN Release 0.1 protocol and should be equipped with Generic 1AE13.01 (or higher) software and associated AIN SSP features. The 5ESS switches may utilize an AIN Release 0.1 protocol and should be equipped with Generic 5E12 (or higher) software and associated AIN SSP features. The DMS-100 switches (release NA009) may utilize an AIN Release 0.1 protocol and associated AIN SSP features. The AXE-10 switches may utilize an AIN Release 0.1 protocol and should be equipped with Generic 8.07 (or higher) software and associated AIN SSP features. The call service logic of the present invention may be upgraded to accommodate future AIN releases and protocols and future trigger types. Specifications of AIN Release 0.1 SSPs may be found in Bellcore *TR-NWT*-001285, *Switch-Service Control Point Application Protocol Interface Generic Requirements*, the disclosure of which is expressly incorporated by reference herein in its entirety.

Figure 2:
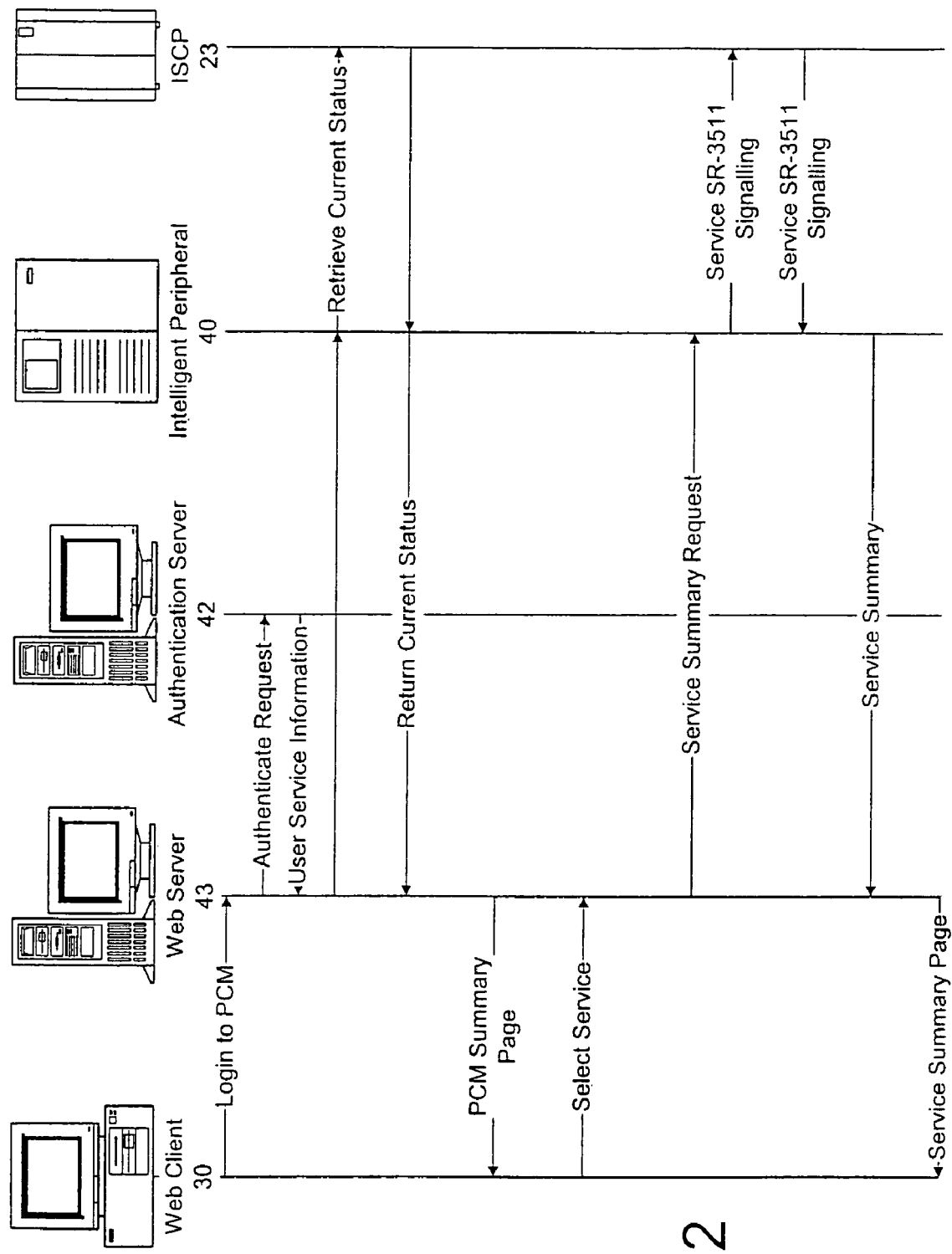
FIG. 2 is a call flow diagram illustrating the process of implementing PCM, according to an aspect of the present invention.

FIG. 2 is an exemplary call flow diagram depicting a subscriber using the PCM service. Initially, the subscriber accesses a public packet switched data network, such as the Internet, from a Web client 30, using a Web browser such as Microsoft Internet Explorer, Netscape Navigator or HotJava. Once on the Internet, the subscriber connects to the Web server 43, which serves as a secure access platform. The Web server 43 receives HyperText Transfer Language Protocol (HTTP) messages from the Web client 30 and provides HyperText Mark-Up Language (HTML) Web pages in response to the subscriber's input-to the Web client 30. The Web pages relate to the subscriber's PCM account.

Once connected to the Web server 43, the user must first log-in to the PCM account, also depicted at block 301 in FIG. 3 and described below. The log-in equates to an authentication of the user. To perform the authentication, the Web server 43 contacts the Authentication/Subscription Information (ASI) Server 42, which confirms that the subscriber is an authorized user by verifying at least the subscriber's name and a password. The ASI Server 42 also provides to the Web server 43 a list of the services to which the user has subscribed in the PCM account. Services for each phone number are linked to the PCM account through the ASI Server 42.

The Web server 43 then retrieves from the ISCP 23, via the intelligent peripheral 40, current service data and the related status of the various services managed through the PCM account. The data and status of the services, i.e., service data, is forwarded to the Web client 30 and displayed as seen for example in FIG. 6, discussed in detail below.

Figure 2A:
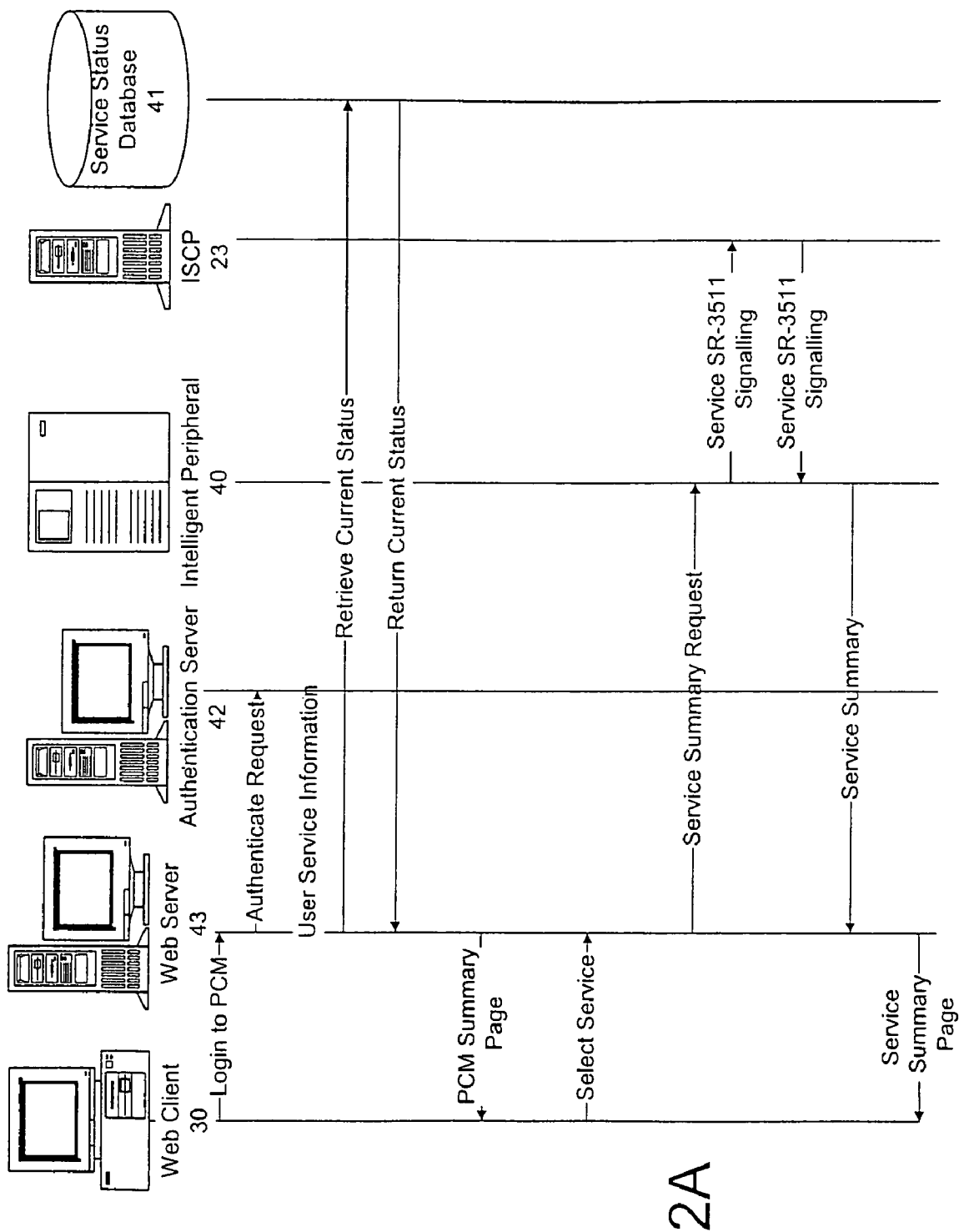
FIG. 2A is a call flow diagram illustrating the process of implementing PCM, according to another aspect of the present invention.

In another embodiment, depicted in FIG. 2A, the Web server 43 retrieves from a Service Status Database 41 the data and status of the various services managed through the PCM account, rather than from the ISCP 23, directly. This database serves as a cache for the service information in the ISCP 23. The Service Status Database 41 contains information current to the most recent update interface with the ISCP 23. The cache arrangement enables the user to efficiently access this information without waiting for the ISCP 23 to process the request. At the same time, it reduces ISCP traffic. The Service Status Database 41 is refreshed periodically to ensure currency, as well as pursuant to specific command by the user. This database is a conventional Lightweight Directory Access Protocol (LDAP), such as the LDAP available from Lucent Technologies, Inc. In the alternative, the database may be a standard relational database, such as those available from Oracle Corporation or Sybase, Inc.

Upon review of the service status, the user may choose to interact with one or all of the available services. When the user selects a desired service, a message is sent to the Web server 43, which responds with the corresponding service screen. When the user selects a particular service necessitating access to the PSTN (e.g., OCC or ICM), the request is sent to the intelligent peripheral 40. Significantly, this is the same intelligent peripheral that implements IVR access to the user's services through a conventional PSTN. In alternative embodiments, the intelligent peripheral may be an IBM Resource Manager or a Lucent PacketIN Application Server. The intelligent peripheral internally translates data messages received from the Web server 43 and accesses the relevant call services data from the ISCP 23 through the SR-3511 protocol, use of which enables the simultaneous compatibility with IVR functions. Details of the SR-3511 protocol are provided in Bellcore, *Recommendation SR-3511 ISCP Intelligent Peripheral (IP) Interface Specification for TCP/IP, Version 5.0* (January 1997), the disclosure of which is expressly incorporated by reference herein in its entirety. In one embodiment, the translation program is in C, C++ or JAVA. The intelligent peripheral 40 then transmits a summary of the requested service, based on information from the ISCP 23, to the Web server 43.

At this point, the user may choose to update or to simply review the service information. When the service is updated, the Web server 43 sends the update instructions in a data message to the intelligent peripheral 40. The intelligent peripheral then translates the update instruction into the SR-3511 protocol and. communicates the updated service parameters directly to the ISCP 23.

For example, one available service is Incoming Call Manager (ICM), by which the user may prioritize, forward, preview or block selected telephone numbers. In the update procedure, the user enters a telephone number to be blocked, for instance, which the Web server 43 communicates to the intelligent peripheral 40. The intelligent peripheral, in turn, sends the data via SR-3511 to the ISCP 23, which flags the number to be blocked. Because the intelligent peripheral's instructions to the ISCP 23 are sent and implemented immediately, without the involvement of the provider's account management or customer service, the changes to the service are operable and available shortly after the user sends the instructions. In an embodiment that includes the Service Status Database 41, the cache will then be updated in due course to reflect the updated information in the ISCP 23.

Figure 3:
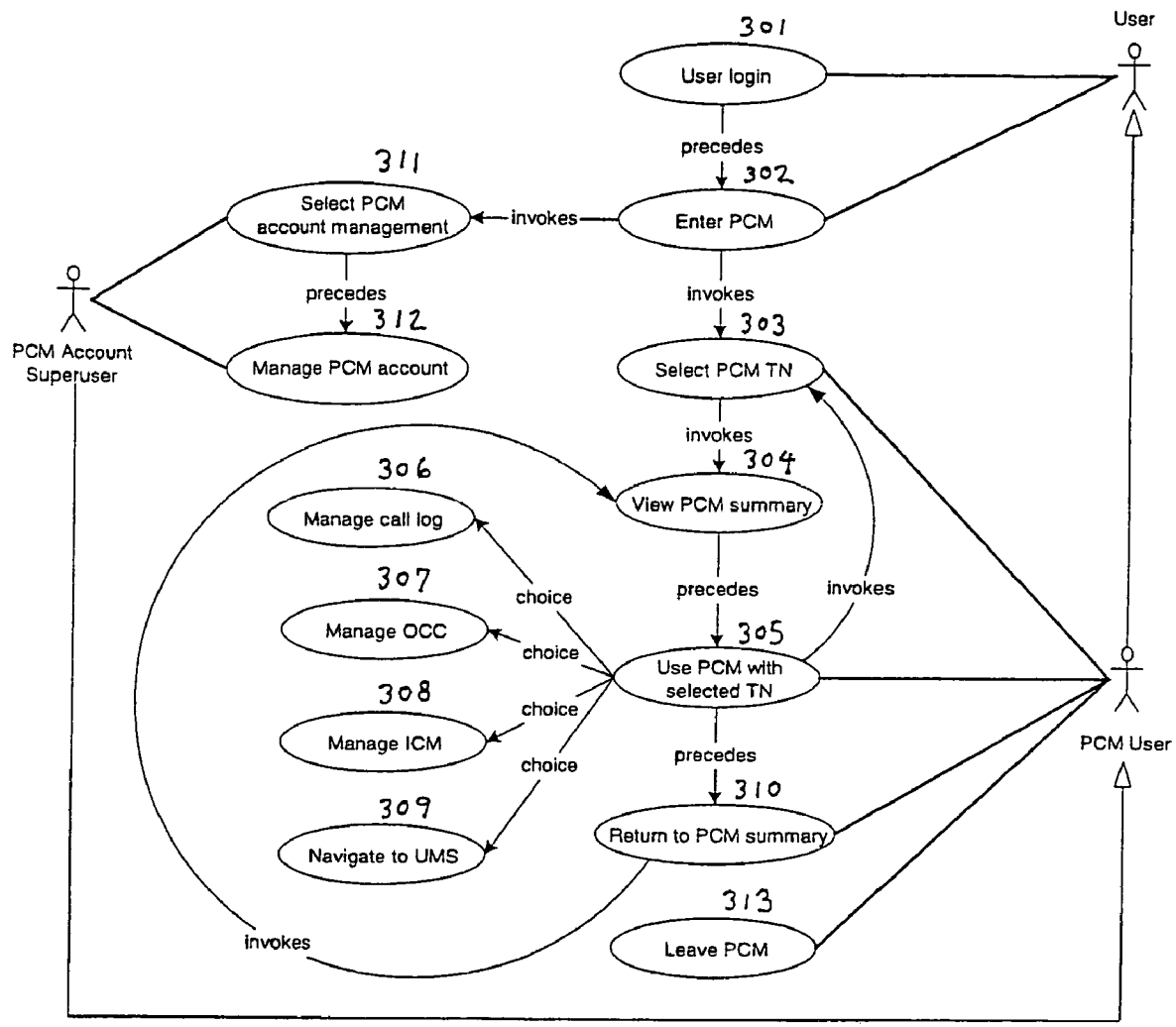
FIG. 3 is a functional block diagram illustrating user action in an exemplary Web-based PCM system, according to an aspect of the present invention.
Figure 4:
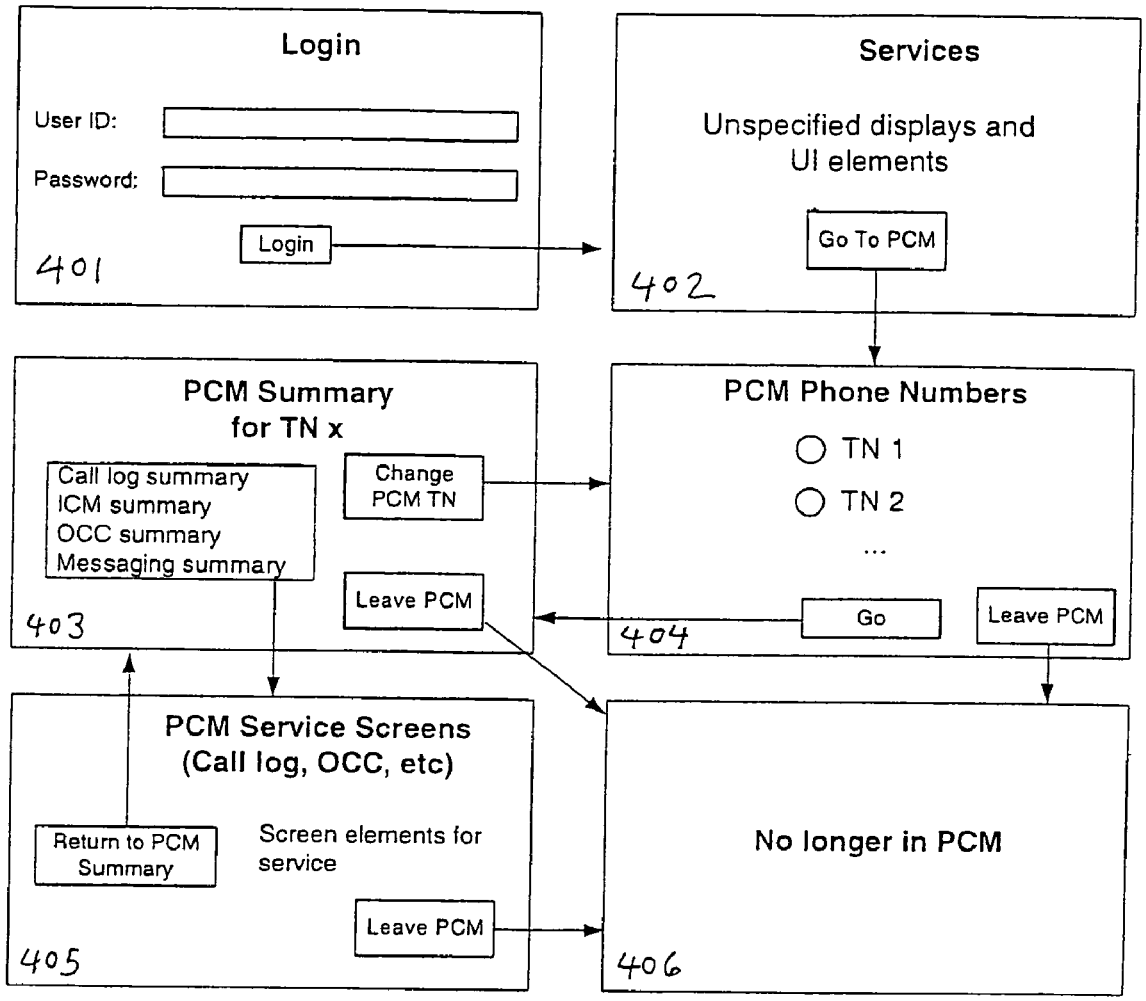
FIG. 4 is an exemplary block diagram illustrating window navigation for basic user actions, according to an aspect of the present invention.

FIG. 3 depicts the procedure followed by the subscriber when first entering the PCM Web site. The subscriber must first log-in at block 301. Assuming the subscriber's PCM account has already been established, as described below, he or she must provide the authentication data to proceed. The authentication data is entered at a log-in screen, an example of which is depicted in FIG. 4 at screen 401. To maintain the integrity of the secure platform, authentication requires preferably a user ID and a password. The user ID is any name, not necessarily unique within the PCM system, selected at account initiation by the subscriber. The password is confidential (at the subscriber's discretion) and must be unique with respect to the associated user ID. The subscriber may change the password as desired, but appropriate authentication data must be provided prior to such changes. If the subscriber enters an invalid user ID or password, the Web server 43 responds with a message explaining the problem and allows another chance to enter correct data.

Figure 5:
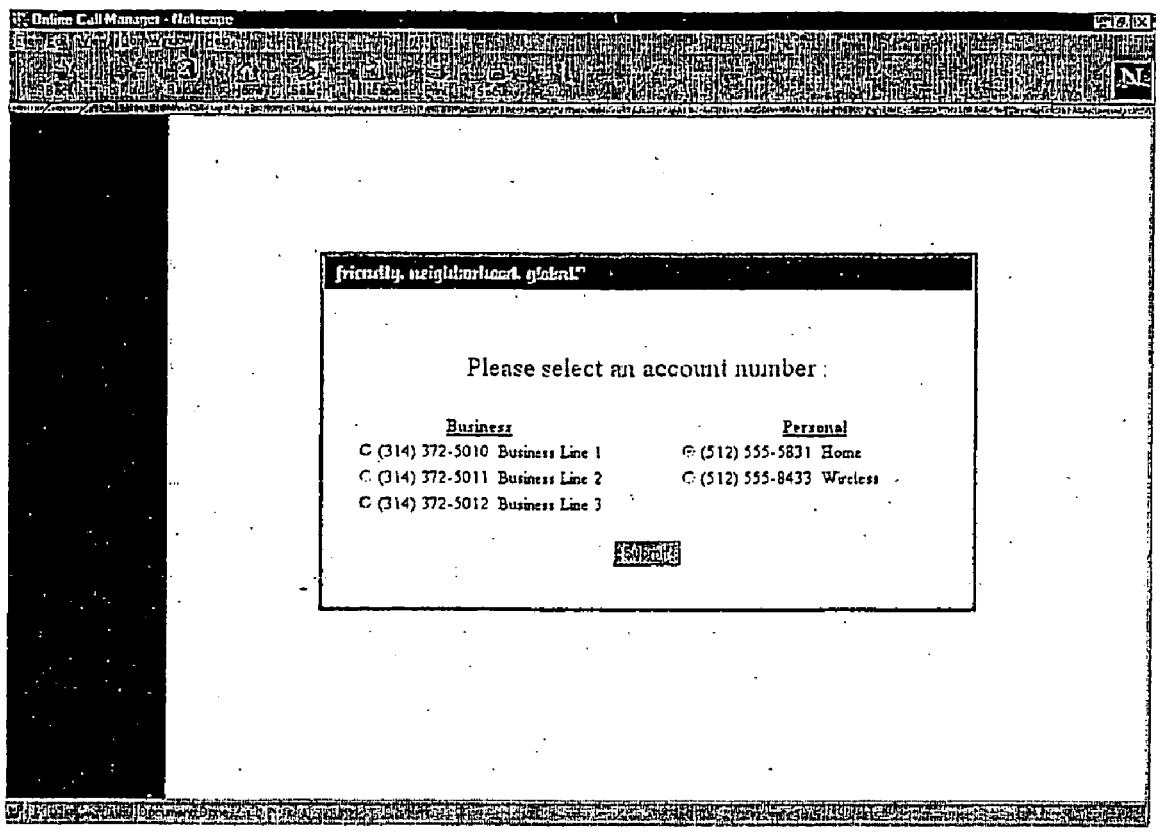
FIG. 5 is an exemplary window to be displayed at the user's PC requesting identification of account number, according to an aspect of the present invention.

After the subscriber is authenticated, the subscriber proceeds to enter the PCM at block 302. At this time, the user views a general informational screen 402, which is formatted at the discretion of the service provider. It may include, by way of example, new services offered to the subscriber. After the subscriber elects to proceed into the PCM, the Web server 43 navigates to a page 404 that displays telephone numbers associated with the PCM account(s) to which the user belongs and to which the user is authorized to access. FIG. 5 depicts an exemplary screen displaying phone numbers to which the user has access. At this point, the user selects a telephone number at block 303 and the corresponding services are displayed for the selected telephone number at screen 403. The user may then elect to implement the various services in place for a particular phone number or, depending on the user's privileges within a particular account, such as a superuser or a PCM user (described later), to manage the PCM account.

If the PCM has more than one associated telephone number, the user would see a Web page listing the numbers, as in block 404 of FIG. 4. The screen has user interface elements that allow the user to select one of the numbers. Thus, each PCM account keeps track of a nonempty set of phone numbers to be managed through the PCM on behalf of the corresponding set of users, presumably members of a family, business, organization or other group.

After the user selects a phone number at block 303, the system displays for the user a PCM summary page 304 corresponding to the selected telephone number. The PCM summary page displays only data the user is authorized to see for the selected telephone number. As shown at screen 403, the PCM summary provides various options to the user, including by way of example, selecting from among listed services 306-309, returning to select an alternative PCM telephone number or exiting PCM altogether 313.

Figure 6:
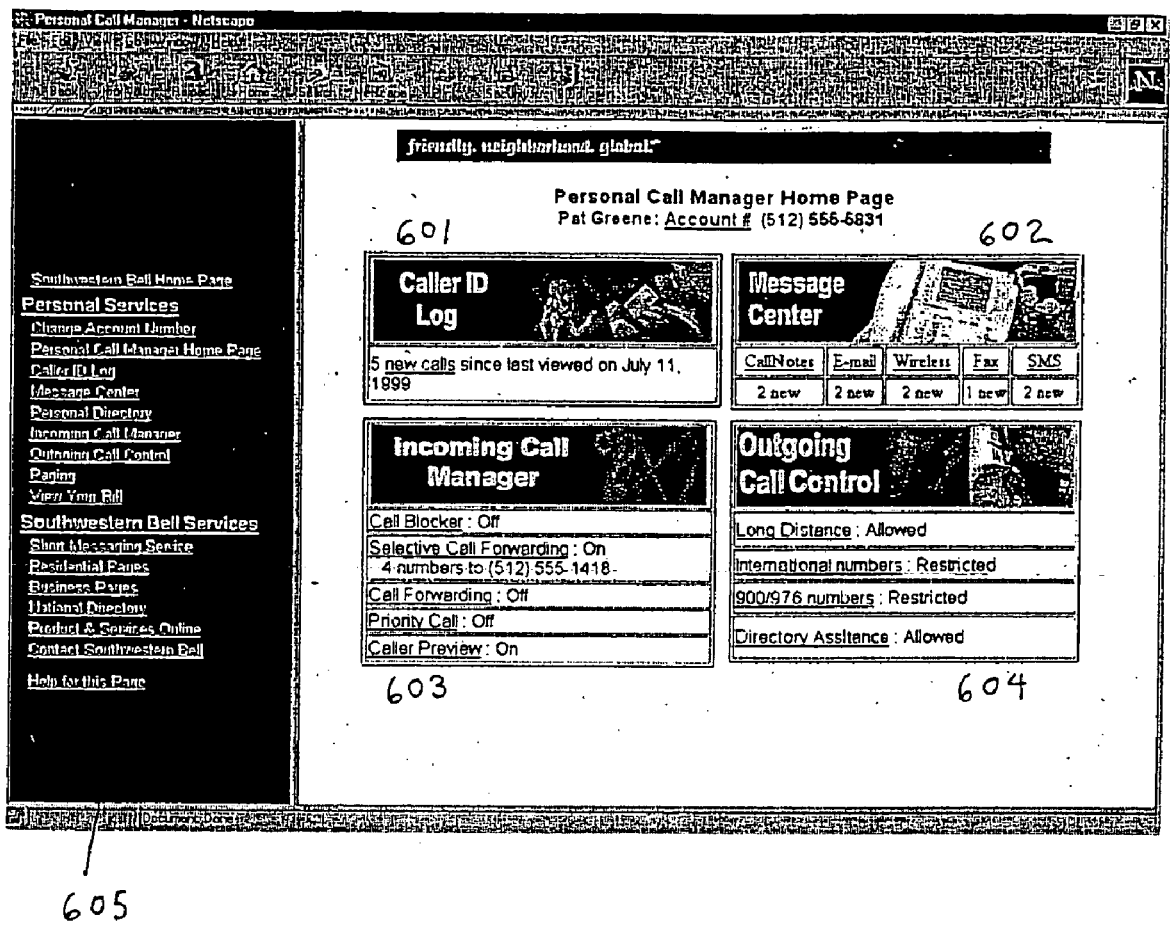
FIG. 6 is an exemplary PCM home page window to be displayed at the user's PC identifying customized user options for a selected account number, according to an aspect of the present invention.

FIG. 6 shows an exemplary PCM summary display, which corresponds to screen 403 of FIG. 4, entitled Personal Call Manager Home Page for account number (512) 555-5831, which is the selected telephone number in the example. FIG. 6 shows four services accessible through the PCM, although the four services are not intended to be limiting. That is, the PCM is able to administer any call services associated with an ISCP 23. The services depicted in the PCM summary screen 403, as well as in FIG. 6, are Caller ID Log 601, Message Center 602, Incoming Call Manager (ICM) 603 and Outgoing Call Control (OCC) 604. The displayed information is summary in fashion, the details being available to the user through selection of one of the available services, which displays a PCM Service screen 405. In the depicted embodiment, the summary as well as the detailed data is provided through the Web server 43 from the ISCP 23 or a Call Logger Database 95 (shown in FIG. 8 and discussed in detail below), depending on the service selected. At the summary screen, the Caller ID Log 601 retrieves data from the Call Logger Database 95 and shows, for example, the number of call records added since the last review and the Message Center 602 likewise retrieves data from the Call Logger Database 95 and shows the number of new call notes, e-mails, wireless calls, faxes and messages reviewed. The ICM 603 retrieves data from the ISCP 23 and shows the status of the call blocker, call forwarding, priority call and caller preview features and an Outgoing (OCC) summary retrieves data from the ISCP 23 and shows whether international calls, long distance calls, 900/976 numbers and/or directory assistance calls are restricted.

From the PCM summary screen, the user may choose to use PCM to manage any of the displayed services, indicated at block 305, FIG. 3. This is done by simply clicking on one of the display boxes 601-604 of FIG. 6 to cause the Web server to display a new Web page corresponding to the selected service. Or, the PCM summary page includes a list of the personal services 605, which duplicates the display boxes. In addition, the list 605 may include additional personal services that do not require interaction with the ISCP 23. These services include, for example, a personal directory, paging capability and billing review.

The paging capability provides the option of paging the subscriber when a Caller ID is received from a subscriber specified phone number. Paging may include a page, a wireless short message, an email, or a generated phone call to a specified number. Moreover, Caller ID logs can be collected and paged to the subscriber at periodic intervals with summary and/or detailed information.

Figure 7:
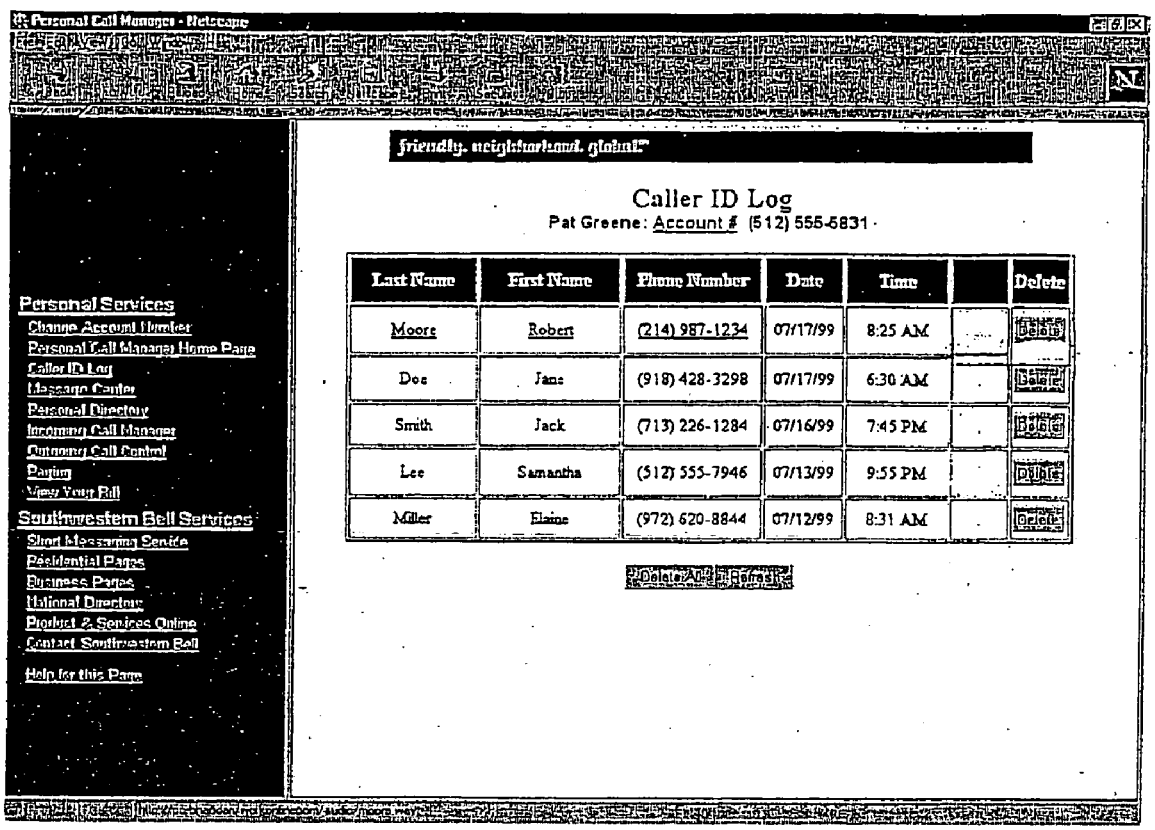
FIG. 7 is an exemplary Caller ID log window to be displayed at the user's PC identifying caller information for a selected account number, according to an aspect of the present invention.

After selection of one of the services, the Web server navigates to and displays the selected services Web page, indicated by blocks 306-309, and displays the corresponding service screen 405. For example, if the user selects the Caller ID service, a Web page as exemplified in FIG. 7 (described later) is displayed. The user may review information, activate or deactivate the service or change the scope of the service, as desired, in accordance with the level of access available to that user. After accessing one of the available services, the user may return to the PCM summary page at block 310. This can be done by selecting a specific option to return or by simply clicking the BACK icon provided by the Web browser. The user may also exit PCM at block 313, ending the current session.

In one embodiment of the invention, a Remote Access Caller Identification (RACLID) service is offered as one of the services available to the user. The RACLID service permits subscribers to access their Caller ID data when they do not have access to customer premises equipment, such as their Caller ID box. Conventional implementation of Caller ID presupposes delivery over the subscriber's telephone line to a Caller ID box attached to that line. According to the invention, the Caller ID data is delivered via the data networks (including, for example, the Internet) to the subscriber. Where RACLID is available and incorporated into the PCM, it is specifically listed as one of the selectable services at the PCM Summary page 403.

As in the case of the other services in PCM, the subscriber can review caller data using RACLID from any location with networking facilities that allows connection to the data network on which the Caller ID data is stored. The networking facilities would include the Internet, a corporate intranet or other TCP/IP network. Also, RACLID may be provided without PCM.

Figure 8:
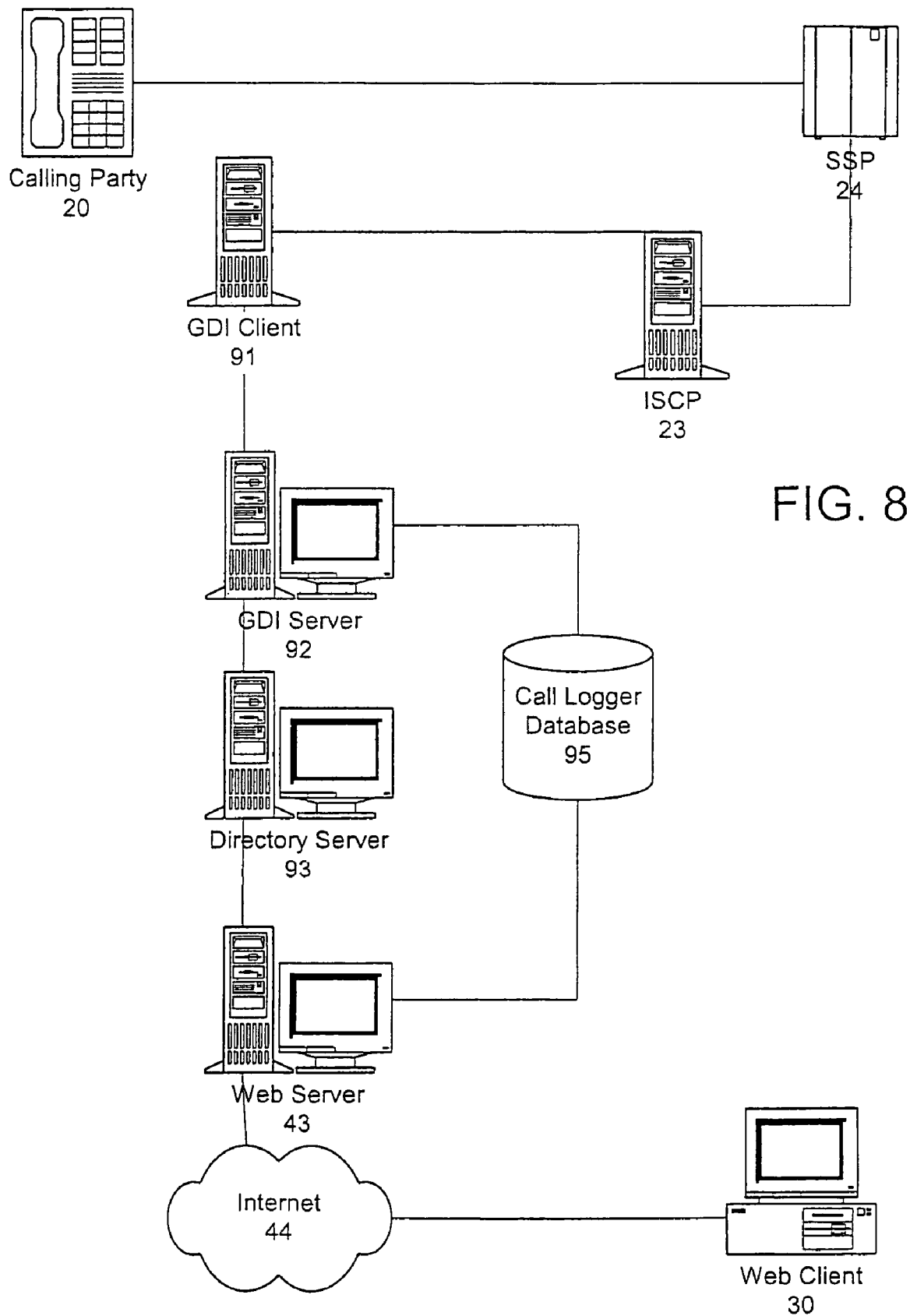
FIG. 8 is a block diagram illustrating system components of the RACLID service, according to an aspect of the present invention.

FIG. 8 illustrates an exemplary telecommunications network in association with an embodiment of the RACLID service. The network includes the calling party 20, the SSP 24, the ISCP 23 and a Bellcore Generic Data Interface (GDI) client 91. The RACLID service does not necessarily depend on the intelligent peripheral 40 incorporated into PCM.

Figure 9:
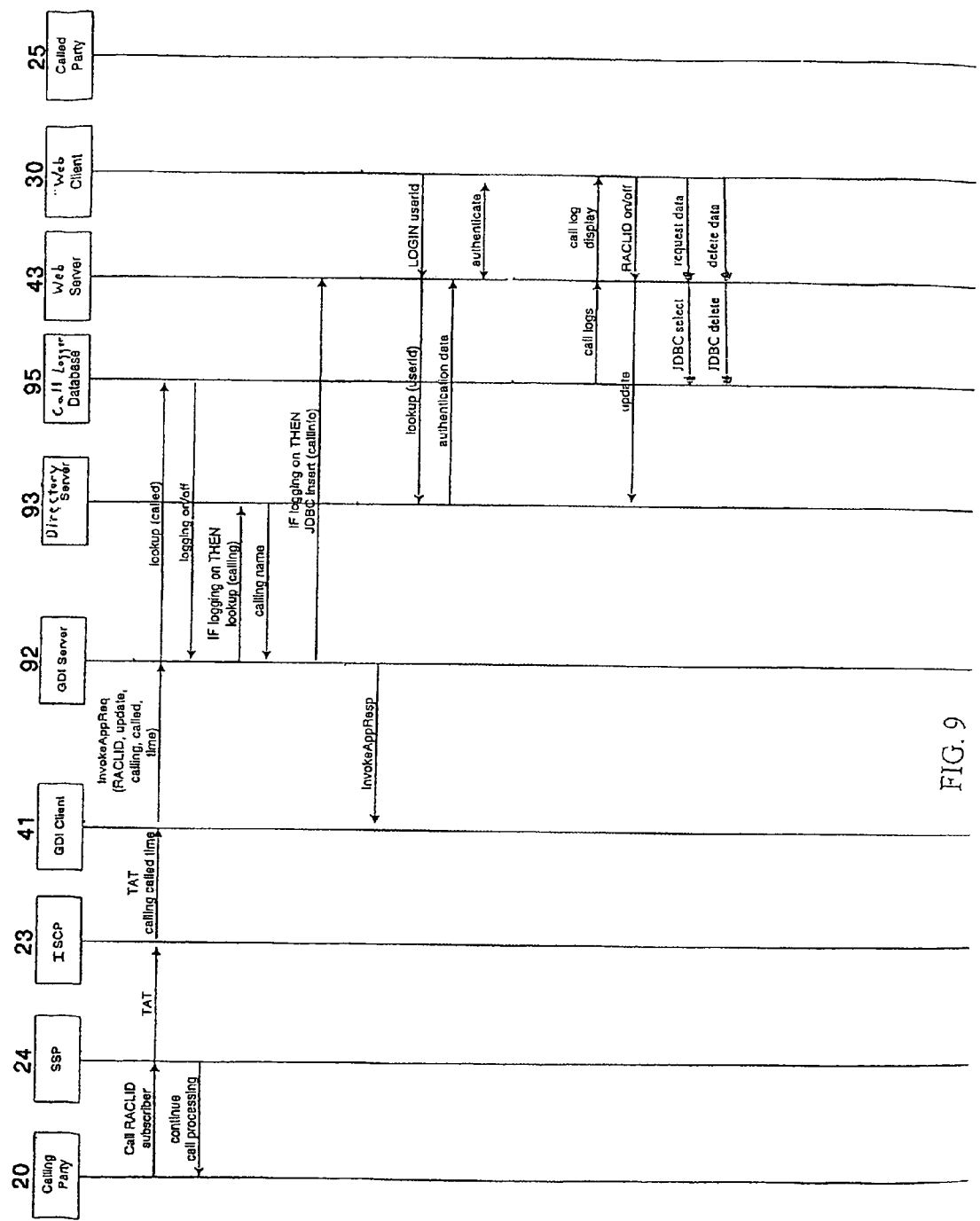
FIG. 9 is a call flow diagram illustrating the process of implementing RACLID, according to an aspect of the present invention.

Outside the PSTN network, the RACLID service requires multiple servers and databases, also depicted in FIG. 9. These elements include a GDI server 92, a directory server 93, a Web server 43 and a Call Logger Database 95. Generally speaking, the GDI server 92 interfaces with the GDI client 91, facilitating communication between the PSTN and the RACLID networks. The directory server 93 contains information stored by the RACLID provider, including data associated with the accessible universe of telephone numbers, regardless of whether they are associated with RACLID subscribers. It also stores authentication data corresponding to RACLID subscribers. In an embodiment of the invention, the directory server 93 can be incorporated into the AIS server 42, which contains authentication data corresponding to PCM in general. In another embodiment, the information stored at the directory server 93 may be incorporated into the Web server 43. The Web server 43 connects the subscriber through the Web client 30 via a data network 44, such as the Internet, and conducts the various interactive operations with RACLID. In alternative embodiments, the Web client 30 is implemented with an IBM Pentium based computer running the Linux or Microsoft Windows operating system and a Web browser, such as Microsoft Internet Explorer or Netscape Navigator. The Call Logger Database 95 contains data associated with specific RACLID accounts. In an embodiment of the invention, the Call Logger Database can be incorporated into the Service Status Database 41.

Referring to FIG. 9, the RACLID system is initiated by an AIN Terminating Attempt Trigger (TAT) launched by the SSr 24 whenever a call is placed by the call originator 20 to a RACLID subscriber's phone 25. Once the trigger has been assigned and activated, every call terminating to the PCM subscriber's line will cause the SSP 24 to launch a TAT query via the existing Signaling System 7 (SS7) network (and appropriate STP 22) to the ISCP 23. The SSP 24 is the terminating central office for the RACLID subscriber. The TAT is assigned to the RACLID subscriber's directory number or line, depending upon the type of switch. Significantly, the call is not suspended at the switch during execution of the RACLID process. Rather, the call completes in a normal fashion.

Once the ISCP 23 receives the TAT query from the SSP 24, the ISCP 23 must interface with the private network, which functions separately from the PSTN. In an embodiment of-the invention, the interface between the ISCP 23 and the private network is the Bellcore Generic Data Interface (GDI) 91 for TCP/IP. This interface provides the capability to send/receive transactions to and from external systems over TCP/IP using Transaction Capabilities Application Part (TCAP) messages. The ISCP 23 can therefore generate messages to get data, send data or invoke an application (InvokeApp) to a GDI server 92.

In an embodiment of the invention, the ISCP 23 sends the InvokeApp message to the GDI server 92. The InvokeApp message includes the calling party number, the called number and the current date and time. By invoking a server external to the PSTN, the ISCP may continue processing the call without having to wait on execution of the RACLID service.

When the GDI server 92 receives the InvokeApp message from the ISCP 23, it first determines whether the subscriber has activated the RACLID service. This avoids unnecessary processing time in the event the RACLID service is OFF. The GDI server 92 accomplishes this by querying the Call Logger Database 95, which contains an ON/OFF indicator dedicated to the subscriber's account. To activate the system, the subscriber accesses the Web server 43 by means of the Web client 30. The Web server 43 in turn accesses the Call Logger Database 95. The subscriber selects the ON option to activate the RACLID service, which then remains active until the subscriber accesses the Call Logger Database 95 and selects the OFF option. The subscriber may perform the ON/OFF commands through any means of access to the Web, as opposed to being limited to the phone number associated with the RACLID account. Note also that any conventional Caller ID system using customer premises equipment, such as a Caller ID box, by the same subscriber is unaffected by the ON/OFF command directed to the RACLID service.

The servers and database communicate with one another using Java Database Conductivity (JDBC), although any appropriate interface may be used. Also, alternative embodiments of the invention combine the various server and database functions into any combination of systems, including a single server. With respect to subscriber access to the system, the communication between the Web server 43 and the Web client 30 uses HTTP, although any appropriate interface may be used.

Once the GDI server 92 detects the active or ON status, it proceeds to contact the directory database server 93 to retrieve the calling party's name associated with the telephone number provided by the ISCP 23. In an embodiment, the directory database server 93 is a Line Information Database (LIDB) server. The LIDB server is maintained independently of the PSTN and updated appropriately by the service provider to assure provision of current information. The invention may include any comparable server, however, including a Lucent LDAP server. After the calling party name is retrieved from the LIDB, the GDI server 92 then provides the calling party's name, along with the caller data provided by the ISCP 23, including the calling party's number, the called number, the call date and the call time (collectively referred to as Caller ID information), to the Call Logger Database 95, where it is stored for later retrieval.

In an alternative embodiment (not pictured), the ISCP 23 contacts the directory database server 93 directly to retrieve the calling party's name associated with the calling party's telephone number. The ISCP 23 then sends the calling party's name to the GDI server 92, along with the calling party's number, the called number and the current date and time in the InvokeApp message. The GDI server 92 then provides this Caller ID information to the Call Logger Database 95, where it is stored for later retrieval. Although obtaining the information from the directory database server 93 somewhat more efficiently, this embodiment requires additional work by the ISCP 23.

In order to retrieve the Caller ID information from the Call Logger Database 95, the subscriber simply accesses the Web server 43 once again, through any means of access to the Web, and enters authentication data at the log-in. Assuming the subscriber is running the PCM, he or she then selects the RACLID option from the PC-M Summary Web page 801 of FIG. 10, which is a block diagram of the various functions available to a typical user at the RACLID service Web page, discussed further below.

Alterative embodiments of the invention do not require specific incorporation of the PCM. For example, one embodiment enables RACLID subscribers, including those who do not necessarily have PCM, to go directly to a RACLID dedicated home page, which would be substantially similar in appearance to that depicted in FIG. 7.

Next, the Web server 43 receives the log-in information from the Web client 30 and queries the directory server 93 to retrieve authentication data corresponding to the user account. The authentication data includes a user identification and a password. The user identification is any name, not necessarily unique within the RACLID system, determined by the subscriber. In one embodiment, the user identification and password correspond to the user identification and password of the PCM. The Web server 43 then requests input of the authentication data from the subscriber and compares the input data with the directory server data to determine a match.

Figure 10:
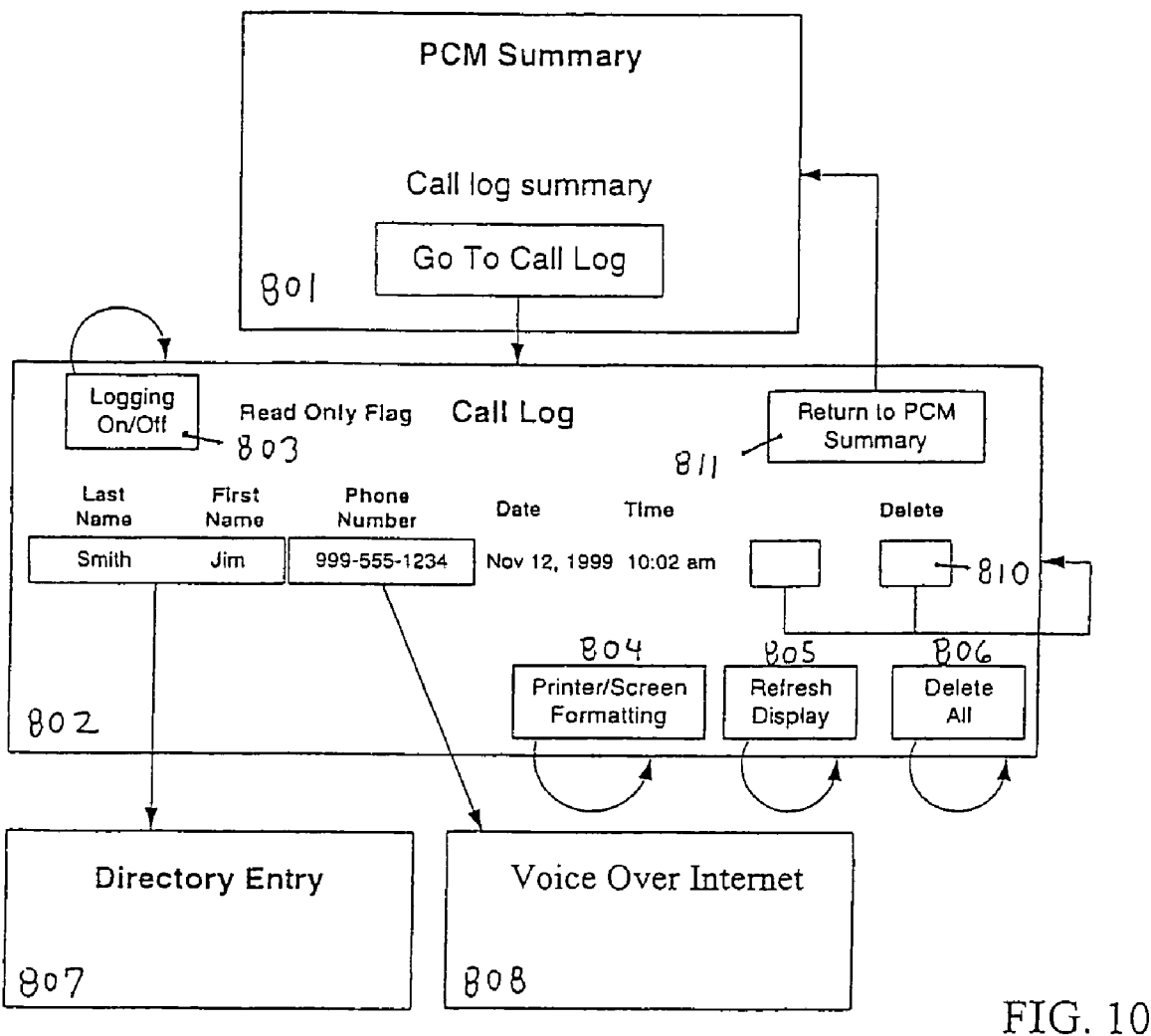
FIG. 10 is a functional block diagram of RACLID as accessed through PCM, according to an aspect of the present invention.

After authentication, the Web server 43 processes the commands entered by the subscriber. Available commands are depicted in FIG. 10 in the Call Log 802. One command sent automatically upon logging onto the RACLID service is the request data command, pursuant to which the Web server 43 retrieves all stored caller information from the Call Logger Database 95, including the calling party's name and corresponding phone number and the date and time the call was placed. This information is displayed as indicated, for example, in FIG. 7.

Another command is the delete data command 810, pursuant to which the Web server 43 removes the stored Caller ID information associated with a selected calling party from the Call Logger Database 95. If no delete command is executed by the subscriber, the Caller ID information stays in the Call Logger Database 95 and will continue to be retrieved pursuant to further request data commands until a delete command is sent or until some predetermined drop time expires, for example, 30 days. In one embodiment, the drop time may be adjusted by the subscriber.

Other interactive commands, shown in FIG. 10, include the delete all command 806 and the refresh display command 805 for the subscriber's convenience. Pursuant to the delete all command, the Web server 43 erases from the Call Logger Database 95 the Caller ID information currently displayed. Pursuant to the refresh display command, the Web server 43 queries the Call Logger Database 95 with an updated request data command, which would retrieve any caller information received after execution of the previous request data command. The ON/OFF switch 803 is also provided on the display Web page to activate/deactivate the RACLID service.

In the PCM environment, RACLID data may be used to accommodate other optional services. For example, the Directory Entry service 807 of FIG. 10, when selected by the user, automatically deposits name and telephone number information in the user's personal directory. In an alternate embodiment, the data may populate data in a PDA, e.g., a 3Com Palm Pilot. The Voice Over Internet 808 automatically places a call to the selected telephone number over the existing network connection. The user can also select the return to PCM Summary option 811 to access other services.

In addition to accessing the various services, the user may elect at block 302 of FIG. 3 to manage his or her PCM account(s). This process begins by selecting PCM account management at block 311 and implementing management instructions at block 312. The extent to which this can be done depends on the user's privileges.

In an embodiment of the invention, a user's interaction with the PCM, as well as the functionality of the PCM, is implemented with object-oriented programming, the terminology of which incorporates "classes" and "types." A class is a programming construct for defining the implementation of objects (e.g. users, telephone numbers, and services) that have the same sort of data and procedures. A type specifies the properties of a set of objects without reference to implementation. A type therefore can be implemented as many different classes. A type can also be implemented as a C++ class or as a JAVA class, and it can even be implemented in multiple ways within the same language.

An important consequence of the difference between types and classes is that an attribute in a type definition may or may not be implemented as an instance variable in a class. A type's attributes represent information that can be known about the type's instances without stating how that information is obtained. An attribute in a type can be implemented as an instance variable. The attribute can also be implemented as a method that computes the attribute real-time. Another consequence of the difference between classes and types is that a subclass is not the same as a subtype. A subclass can both extend and override characteristics of the class from which it is derived. In contrast, a subtype can never override the supertype; it only extends the supertype.

Figure 11:
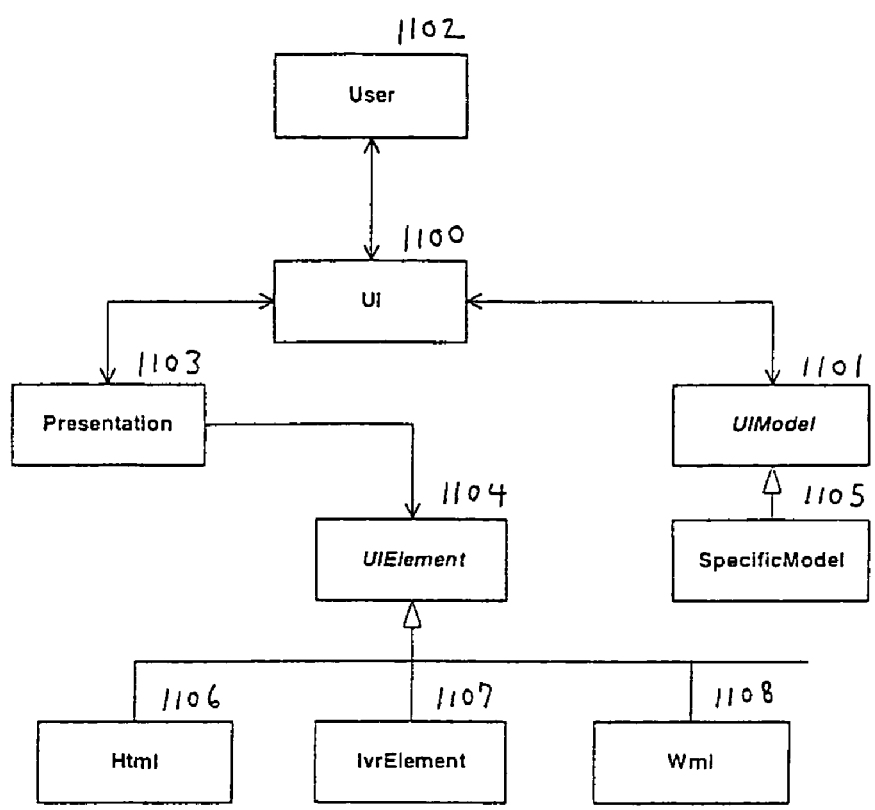
FIG. 11 is a functional block diagram of the User Interface types, according to an aspect of the present invention.

Applying this terminology to invention, the PCM software includes a variety of types and subtypes for implementation and execution. The core of the PCM system is the user interface (UI) type 1100, shown in FIG. 11. Associated with each instance of UI 1100 is a User object 1102 that represents the user currently interacting with it. The UI 1100 also includes a reference to the object it displays and manipulates, i.e. its model. This object is a type UIModel 1101, a type from which specific model types 1105 are derived. A Presentation object 1103 associated with the UI 1100 enables the presentation of the model to the user. Presentations are composed of UIEElements 1104, which may be HTML 1106 (for Web pages), WML 1108 (for WAP terminals), or IvrElements 1107 (for IVRs).

Figure 12:
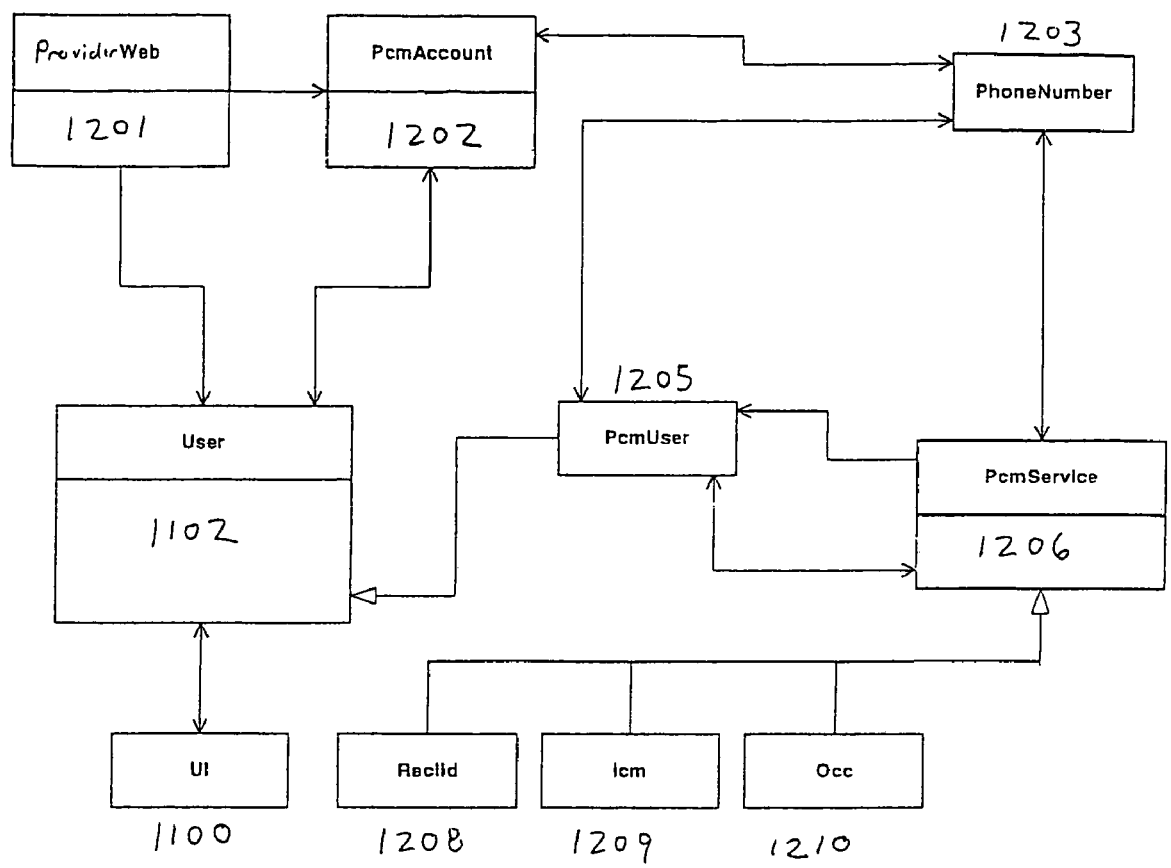
FIG. 12 is a functional block diagram of the Core PCM types, according to an aspect of the present invention.

Additional PCM types are depicted in FIG. 12. In one embodiment of the invention, users are placed into one of multiple subtypes of User 1102, including webmaster (not pictured), superuser (not pictured) and PcmUser 1205. The webmaster, who is associated with the PCM provider, creates the PCM accounts and has access to the administrative facilities of the PCM network, including all PCM accounts and associated administrative facilities. A superuser is a user who has read and write privileges in the account. A superuser can therefore alter or customize the PCM account and the services managed by that account. This includes controlling the scope of access by other users (except the webmaster). Each PCM account must have at least one superuser.

Each PcmUser 1205 has one or more PCM accounts, each of which comprises at least one phone number, but has read only privileges with respect to each account. In other words, a PcmUser is not authorized to customize the PCM account or otherwise alter the various services, although the PcmUser 1205 can review data in the various services and activate/deactivate these services.

Administrative interaction with the PCM account uses PcmAccount 1202 operations, which include for example setName, setID, setSuperUser, addUser, removeUser, addPhoneNumber, removePhoneNumber, addService and removeService, which enable the account to be defined. Management of a PCM account includes creating the account. To do so, the subscriber must provide necessary personal information to the PCM service provider in exchange for the unique log-in ID and-name. The webmaster initiates the account using the setName and setID operations, respectively. The ID is essentially the password and therefore must differ from every other PCM account ID known to the system. The name, however, need not be necessarily unique.

In its initial state, a PCM account is additionally assigned a superuset (usually the subscriber), a set of authorized users (initially consisting only of the account superuser), a personal directory for the superuser and a set of one or more associated phone numbers. The webmaster sets the initial PCM account superuser using the setSuperUser operation. The superuser must be a member of the account and, as stated above; has read and write privileges to the account. Either the webmaster or the account superuser can then add new users to the account if a new user is not already a member using the addUser operation. After an operation adding a user is complete, the PCM account and the new user will cross reference each other in the attributes of User 1102 and PcmAccount 1202, which information is stored in the ASI server 42 in one embodiment.

This operation does not provide the new user access to any of the account telephone numbers, which is performed separately under an AddPhoneNumber operation on a phone number by phone number basis. This data is likewise stored at the ASI server 42. Both the webmaster and the superuser provide access to the specified phone number within the PCM account. The telephone number and user must already belong to the account.

The webmaster or the superuser can likewise remove a user from an account if the user is already a member of the account using the removeUser operation. The user to be removed cannot be the account's superuser. After the operation completes, the cross-references in the attributes of User 1102 and PcmAccount 1202 are eliminated and all telephone number access privileges are revoked.

The webmaster can add a telephone number to a PCM account if that phone number is not already in the account. Again, after the operation completes, the account and the new phone number will have references to each other in the attributes of User 1102 and PcmAccount 1202 stored at the AIS Server 42. The added phone number will necessarily include the account's superuser in its list of allowed users. The webmaster can likewise remove a phone number from a PCM account if that phone number already belongs to the account using the removePhoneNumber operation. After the operation completes, neither the account nor the telephone number have references to each other in attributes of User 1102 and PcmAccount 1202.

The webmaster can perform other functions in the PCM account, as well. For example, the webmaster can add a service to a telephone number in an account if that service is not already present on that phone number. The webmaster can likewise remove a service from a phone number in an account. Also, the webmaster can add or remove a personal directory to the account.

The type PhoneNumber 1203 represents a phone number that can be accessed and managed through the PCM. Every phone number must have an associated list of allowed users, including at least the account's superuser. Likewise, every user allowed access to a phone number must be a member of the PCM account to which the phone number belongs. A user who has been granted PCM access to a phone number can retrieve a summary user interface of information about the services associated with that number.

The PcmService 1206 represents a service associated with a specific phone number that can be managed through the PCM. Specific services are represented by subtypes derived from PcmService, including RACLID 1208, ICM 1209, OCC 1210, etc. As stated above, the webmaster can create a new instance of a PCM service, give it a name and associate it with a phone number. That phone number adds the service to its set of associated services at PhoneNumber 1203. The new service has only one user, the superuser, with which it is associated. That user is given read-write privileges. However, the webmaster and the superuser can add other users to the account and give read-only or read-write privileges to a service associated with the account.

ProviderWeb 1201 is a type that represents the service provider's Web and its administrative facility. The webmaster aid logged in users are known to the provider Web. In its initial state, ProviderWeb 1201 has no users other than the webmaster. The webmaster can add a new user if that user does not already exist. The webmaster can also remove an existing user from ProviderWeb 1201 if that user is not currently logged in. The webmaster can also suspend and reactive users. Of course, a user who provides the proper log-in ID can log into ProviderWeb 1201, so long as the user is not already logged in or suspended. ProviderWeb 1201 performs periodic housekeeping, during which it logs out users who have been inactive too long, except for the webmaster. In an embodiment of the invention, a dime threshold for inactivity may be 30 days.

When a PCM user first enters the PCM, he or she is presented with the phone numbers they are authorized to manage under the PCM account, as discussed above. From these phone numbers, the PCM user selects one phone number to manage invoking SelectTnUI, which is a subtype of UI that handles the specifics of phone number selection. Its associated model is the set of PCM phone numbers from which the user selects the desired phone number. After the PCM user selects a phone number, the system presents a summary page including information about the active services associated with the selected phone number. PcmSummaryUI is a subtype of UI that handles the specifics of the PCM summary display. Its associated model is the user's currently selected phone number.

At this point the user selects the PCM service he or she wishes to execute. The various services that can be managed through the PCM are represented by subtypes of PcmService, identified above. For each subtype, the user must have read and write or read only privileges to the particular service. The data retrieved from the service is formatted for the medium with which the user is currently accessing the PCM.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, SHTML, DHTML, XML, PPP, FTP, SMTP, MIME); peripheral control (IrDA; RS232C; USB; ISA; ExCA; PCMCIA), and public telephone networks (ISDN, ATM, xDSL) represent examples of the state of the art. Such standards are periodically superseded by faster or more efficient equivalents having essentially the same functions. Accordingly, replacement standards and protocols having the same functions are considered equivalents.

What is claimed is:

1. A method for reviewing service data relating to a subscriber's telecommunications services using a graphical user interface, the method comprising:
   receiving a data message from the subscriber at an intelligent peripheral via at least one data network, the data message indicating a subscriber's desire to review the service data;
   converting the data message into a protocol compatible with a network controller, the converted data message being identical to a data message that the intelligent peripheral would create if the subscriber had indicated the desire to review the service data via an interactive voice response system;
   transmitting the converted data message to the network controller;
   retrieving the service data from the network controller; and
   forwarding the service data to the subscriber via the intelligent peripheral,
   wherein the subscriber retains the ability to review service data via an interactive voice response system.

2. The method of claim 1,
   wherein the protocol comprises SR-3511.

3. The method of claim 1,
   wherein the at least one data network comprises a packet switched data network.

4. A method for reviewing and updating a subscriber's telecommunications services using a graphical user interface via a plurality of data networks, the method comprising:
   presenting service data to the subscriber at the graphical user interface via at least one of the plurality of data networks;
   receiving a data message from the graphical user interface at an intelligent peripheral via at least one of the data networks, the data message indicating a desired update to a selected telecommunications service;
   converting the data message into a protocol compatible with a service control point, the converted data message being identical to a data message that the intelligent peripheral would create if the desired update had been received via an interactive voice response system;

transmitting the converted data message to the service control point; and updating the selected telecommunications service in accordance with the desired update, wherein the selected telecommunications service is updated substantially contemporaneously with the update being received from the graphical user interface, and wherein the subscriber retains the ability to update and review service data via the interactive voice response system.

5. The method of claim 4,
wherein the presenting further comprises retrieving the service data from a service status database, which is periodically updated by the service control point, wherein traffic to the service control point is reduced.

6. The method of claim 5,
wherein the protocol comprises SR-3511.

7. The method of claim 4,
wherein the at least one of the plurality of data networks comprises a packet switched data network.

8. The method of claim 7,
wherein the packet switched data network comprises the Internet.

9. The method of claim 7,
wherein the interactive voice response system is accessible via a public switched telephone network.

10. A method for accessing service data relating to a subscriber's advanced intelligent network (AIN) telecommunications services using a graphical user interface (GUI) via a plurality of data networks, and using an interactive voice response (IVR) system via a public switched telecommunications network, the method comprising:

providing the subscriber with an option of accessing the service data through a plurality of interfaces including the IVR system and the GUI;

selecting one of the IVR system and the GUI;

accessing the service data via an intelligent peripheral, the intelligent peripheral obtaining the service data from a service control point; and presenting the service data to the subscriber via the selected interface, wherein the subscriber can access the service data via the IVR system and via the GUI based upon the subscriber's selection.

11. A system for reviewing and updating a subscriber's telecommunications services via a plurality of data networks, the system comprising:

a web client through which the subscriber views service data received via the data networks, and through which the subscriber requests service data updates, the service data being displayed at a graphical user interface;

a web server that receives a data message transmitted from the subscriber in response to a service data update, the data message indicating a subscriber's desired update to a selected telecommunications service;

an intelligent peripheral that receives the data message via at least one of the data networks, the intelligent peripheral translating the data message into a standard protocol, the translated data message being identical to a data message that the intelligent peripheral would create if the subscriber had entered the desired update via an interactive voice response system; and a network controller that receives the message in the standard protocol, the controller updating the selected telecommunications service in accordance with the subscriber's desired update, wherein the selected telecommunications service is updated in the controller substantially contemporaneously with the subscriber requesting the update at the graphical user interface, and wherein the subscriber retains the ability to update and review the service data via an interactive voice response system.

12. The system of claim 11,
wherein the network controller comprises a service control point.

13. The system of claim 12,
wherein the protocol comprises SR-3511.

14. The system of claim 12, further comprising:
a service status database from which the service data is initially retrieved, whereby service control point traffic is reduced.

15. The system of claim 11,
wherein the web server receives the data message transmitted from the subscriber via a packet switched data network.

16. The system of claim 15,
wherein the packet switched data network comprises the Internet.

* * * * *